(12) United States Patent
Mikami et al.

(10) Patent No.: US 12,163,235 B2
(45) Date of Patent: Dec. 10, 2024

(54) DEVICE FOR PRODUCING FLUORINE GAS AND LIGHT SCATTERING DETECTOR

(71) Applicant: SHOWA DENKO K.K., Tokyo (JP)

(72) Inventors: Katsumi Mikami, Tokyo (JP); Yohsuke Fukuchi, Tokyo (JP); Hiroshi Kobayashi, Tokyo (JP)

(73) Assignee: Resonac Corporation, Tokyo (JP)

( * ) Notice: Subject to any disclaimer, the term of this patent is extended or adjusted under 35 U.S.C. 154(b) by 485 days.

(21) Appl. No.: 17/614,801

(22) PCT Filed: Dec. 3, 2020

(86) PCT No.: PCT/JP2020/045092
§ 371 (c)(1),
(2) Date: Nov. 29, 2021

(87) PCT Pub. No.: WO2021/131578
PCT Pub. Date: Jul. 1, 2021

(65) Prior Publication Data
US 2022/0228273 A1  Jul. 21, 2022

(30) Foreign Application Priority Data

Dec. 27, 2019  (JP) ................................. 2019-238474

(51) Int. Cl.
*C25B 1/245*  (2021.01)
*C25B 9/00*  (2021.01)
(Continued)

(52) U.S. Cl.
CPC ............... *C25B 1/245* (2013.01); *C25B 9/00* (2013.01); *C25B 9/09* (2021.01); *C25B 15/023* (2021.01);
(Continued)

(58) Field of Classification Search
CPC .................................. C25B 1/24; C25B 1/245
(Continued)

(56) References Cited

U.S. PATENT DOCUMENTS 2,969,708 A * 1/1961 Polanyi .............. G01N 15/0205
356/336
4,441,816 A * 4/1984 Hencken ............ G01N 15/0205
356/335
(Continued)

FOREIGN PATENT DOCUMENTS

| CN | 1119737 A | 4/1996 |
| CN | 103069265 A | 4/2013 |

(Continued)

OTHER PUBLICATIONS

International Preliminary Report on Patentability with the translation of Written Opinion dated Jun. 28, 2022 from the International Bureau in Application No. PCT/JP2020/045092.
(Continued)

*Primary Examiner* — Harry D Wilkins, III
(74) *Attorney, Agent, or Firm* — Sughrue Mion, PLLC

(57) ABSTRACT

A device for producing fluorine gas has a first flow path configured to send a fluid from the inside of an electrolytic cell through a mist removal unit configured to remove mist from the fluid to a fluorine gas selection unit and a second flow path configured to send the fluid from the inside of the electrolytic cell to the fluorine gas selection unit without passing through the mist removal unit and has a flow path switching unit configured to switch a flow path through which the fluid flows depending on the average particle size of the mist measured by an average particle size measurement unit. The second flow path has a clogging suppression mechanism configured to suppress clogging of the second flow path by the mist.

17 Claims, 15 Drawing Sheets

(51) Int. Cl.
  *C25B 9/09* (2021.01)
  *C25B 15/023* (2021.01)
  *C25B 15/08* (2006.01)
  *G01N 15/02* (2024.01)
  *G01N 15/0205* (2024.01)

(52) U.S. Cl.
  CPC ........ *C25B 15/085* (2021.01); *G01N 15/0211* (2013.01); *G01N 2015/0277* (2013.01)

(58) Field of Classification Search
  USPC .......................................................... 205/411
  See application file for complete search history.

(56) References Cited

U.S. PATENT DOCUMENTS

| | | | |
|---|---|---|---|
| 5,506,673 A | 4/1996 | Kosaka et al. | |
| 6,198,110 B1* | 3/2001 | Kaye | G01N 15/1436 356/336 |
| 9,073,866 B2 | 7/2015 | Kagabu et al. | |
| 2003/0047445 A1* | 3/2003 | Tojo | C25B 1/245 204/243.1 |
| 2005/0132882 A1* | 6/2005 | Hayakawa | C25B 15/02 62/142 |
| 2005/0224366 A1* | 10/2005 | Hodgson | C25B 9/70 205/619 |
| 2005/0268694 A1* | 12/2005 | Moriya | H01J 37/32935 73/28.01 |
| 2009/0079981 A1* | 3/2009 | Holve | G01N 15/0205 356/336 |
| 2012/0085640 A1* | 4/2012 | Miyazaki | C25B 1/245 204/247 |
| 2012/0228144 A1 | 9/2012 | Pernice et al. | |
| 2013/0032471 A1 | 2/2013 | Yao et al. | |
| 2013/0150414 A1 | 6/2013 | Kagabu et al. | |
| 2015/0292092 A1 | 10/2015 | Yao et al. | |
| 2016/0306367 A1 | 10/2016 | Dattner | |
| 2022/0213605 A1* | 7/2022 | Mikami | C25B 1/245 |

FOREIGN PATENT DOCUMENTS

| | | |
|---|---|---|
| CN | 104350181 A | 2/2015 |
| CN | 110042434 A | 7/2019 |
| EP | 0106684 A3 | 4/1984 |
| JP | 61-71336 A | 4/1986 |
| JP | 2002-22642 A | 1/2002 |
| JP | 2004-353015 A | 12/2004 |
| JP | 2007-71831 A | 3/2007 |
| JP | 2011-225922 A | 11/2011 |
| JP | 2013-507629 A | 3/2013 |
| JP | 5584904 B2 | 9/2014 |
| JP | 5919824 B2 | 5/2016 |
| WO | 2006/043125 A1 | 4/2006 |
| WO | 2013/092773 A1 | 6/2013 |

OTHER PUBLICATIONS

International Search Report dated Feb. 2, 2021 in Application No. PCT/JP2020/045092.

* cited by examiner

DEVICE FOR PRODUCING FLUORINE GAS AND LIGHT SCATTERING DETECTOR

CROSS REFERENCE TO RELATED APPLICATIONS

This application is a National Stage of International Application No. PCT/JP2020/045092 filed on Dec. 3, 2020, claiming priority based on Japanese Patent Application No. 2019-238474 filed on Dec. 27, 2019.

TECHNICAL FIELD

The present invention relates to a device for producing fluorine gas and a light scattering detector.

BACKGROUND ART

Fluorine gas can be synthesized by electrolyzing an electrolyte containing hydrogen fluoride and a metal fluoride (electrolytic synthesis). Since the electrolysis of the electrolyte generates not only the fluorine gas but also mist (for example, the mist of the electrolyte), the fluorine gas sent out from an electrolytic cell is accompanied by the mist. The mist that has accompanied the fluorine gas becomes fine particles, and there is a concern that the fine particles may clog a pipe or a valve that is used to send the fluorine gas. Therefore, there has been a case where operation for producing the fluorine gas needs to be interrupted or stopped, which hinders continuous operation in the production of the fluorine gas by an electrolysis method.

PTL 1 discloses a technology in which fluorine gas that is accompanied by mist or a pipe through which the gas passes is heated to the melting point of an electrolyte or higher to suppress clogging of the pipe or valves by the mist. In addition, PTL 2 discloses a gas production device including a gas diffusion unit as a space to roughly collect mist and a filler storage unit storing a filler for adsorbing mist.

CITATION LIST

Patent Literature

PTL 1: Japanese Patent No. 5584904
PTL 2: Japanese Patent No. 5919824

SUMMARY OF INVENTION

Technical Problem

However, there has been a desire for a technology capable of more effectively suppressing clogging of pipes or valves by mist.

An object of the present invention is to provide a device for producing fluorine gas capable of suppressing clogging of pipes or valves by mist. In addition, another object of the present invention is to provide a light scattering detector that can be used in the above-described device for producing fluorine gas.

Solution to Problem

An aspect of the present invention is as described in the following [1] to [8] to achieve the above-described object.

[1] A device for producing fluorine gas in which an electrolyte containing hydrogen fluoride and a metal fluoride is electrolyzed to produce fluorine gas, the device including an electrolytic cell storing the electrolyte and configured to perform the electrolysis, an average particle size measurement unit configured to measure an average particle size of mist contained in a fluid generated inside the electrolytic cell during the electrolysis of the electrolyte, a mist removal unit configured to remove the mist from the fluid, a fluorine gas selection unit configured to select and extract fluorine gas from the fluid, and a flow path configured to send the fluid from an inside of the electrolytic cell to the fluorine gas selection unit, in which the flow path has a first flow path configured to send the fluid from the inside of the electrolytic cell through the mist removal unit to the fluorine gas selection unit and a second flow path configured to send the fluid from the inside of the electrolytic cell to the fluorine gas selection unit without passing through the mist removal unit and has a flow path switching unit configured to switch a flow path through which the fluid flows depending on the average particle size of the mist measured by the average particle size measurement unit, the flow path switching unit is configured to send the fluid to the first flow path from the inside of the electrolytic cell in a case where the average particle size of the mist measured by the average particle size measurement unit is equal to or less than a predetermined reference value and to send the fluid to the second flow path from the inside of the electrolytic cell in a case where the average particle size of the mist is more than the predetermined reference value, and the second flow path has a clogging suppression mechanism configured to suppress clogging of the second flow path by the mist.

[2] The device for producing fluorine gas according to [1], in which the average particle size measurement unit measures an average particle size of mist contained in a fluid generated at an anode of the electrolytic cell.

[3] The device for producing fluorine gas according to [1] or [2], in which the clogging suppression mechanism is a pipe having a larger diameter than the first flow path.

[4] The device for producing fluorine gas according to any one of [1] to [3], in which the clogging suppression mechanism is a pipe inclined with respect to a horizontal direction and extending in a direction in which the pipe runs downward from an upstream side toward a downstream side.

[5] The device for producing fluorine gas according to [1] or [2], in which the clogging suppression mechanism is a rotary screw installed inside the second flow path and configured to send the mist accumulated inside the second flow path to an upstream side or a downstream side.

[6] The device for producing fluorine gas according to [1] or [2], in which the clogging suppression mechanism is an airflow generator configured to cause an airflow for increasing a flow rate of the fluid flowing in the second flow path to flow.

[7] The device for producing fluorine gas according to any one of [1] to [6], in which the average particle size measurement unit includes a light scattering detector, the light scattering detector includes
a sample chamber configured to store the fluid,
a light source configured to irradiate the fluid in the sample chamber with light for light scattering measurement, a scattered light detection unit configured to detect scattered light generated by scattering of the light for light scattering measurement by the mist, and a transparent window installed in the sample chamber to come into contact with the fluid and configured to transmit the light for light scattering measurement or the scattered light, and the transparent window is formed of at least one selected from diamond, calcium fluoride, potassium fluoride, silver fluoride, barium fluoride, and potassium bromide.

[8] A light scattering detector configured to measure an average particle size of mist contained in a fluid generated inside an electrolytic cell at a time of producing fluorine gas by electrolyzing an electrolyte containing hydrogen fluoride and a metal fluoride inside the electrolytic cell of a device for producing fluorine gas, the light scattering detector including a sample chamber configured to store the fluid, a light source configured to irradiate the fluid in the sample chamber with light for light scattering measurement, a scattered light detection unit configured to detect scattered light generated by scattering of the light for light scattering measurement by the mist, and a transparent window installed in the sample chamber to come into contact with the fluid and configured to transmit the light for light scattering measurement or the scattered light, in which the transparent window is formed of at least one selected from diamond, calcium fluoride, potassium fluoride, silver fluoride, barium fluoride, and potassium bromide.

Advantageous Effects of Invention

According to the present invention, it is possible to suppress clogging of pipes or valves by mist at the time of producing fluorine gas by electrolyzing an electrolyte containing hydrogen fluoride and a metal fluoride.

DESCRIPTION OF EMBODIMENTS

Figure 1:
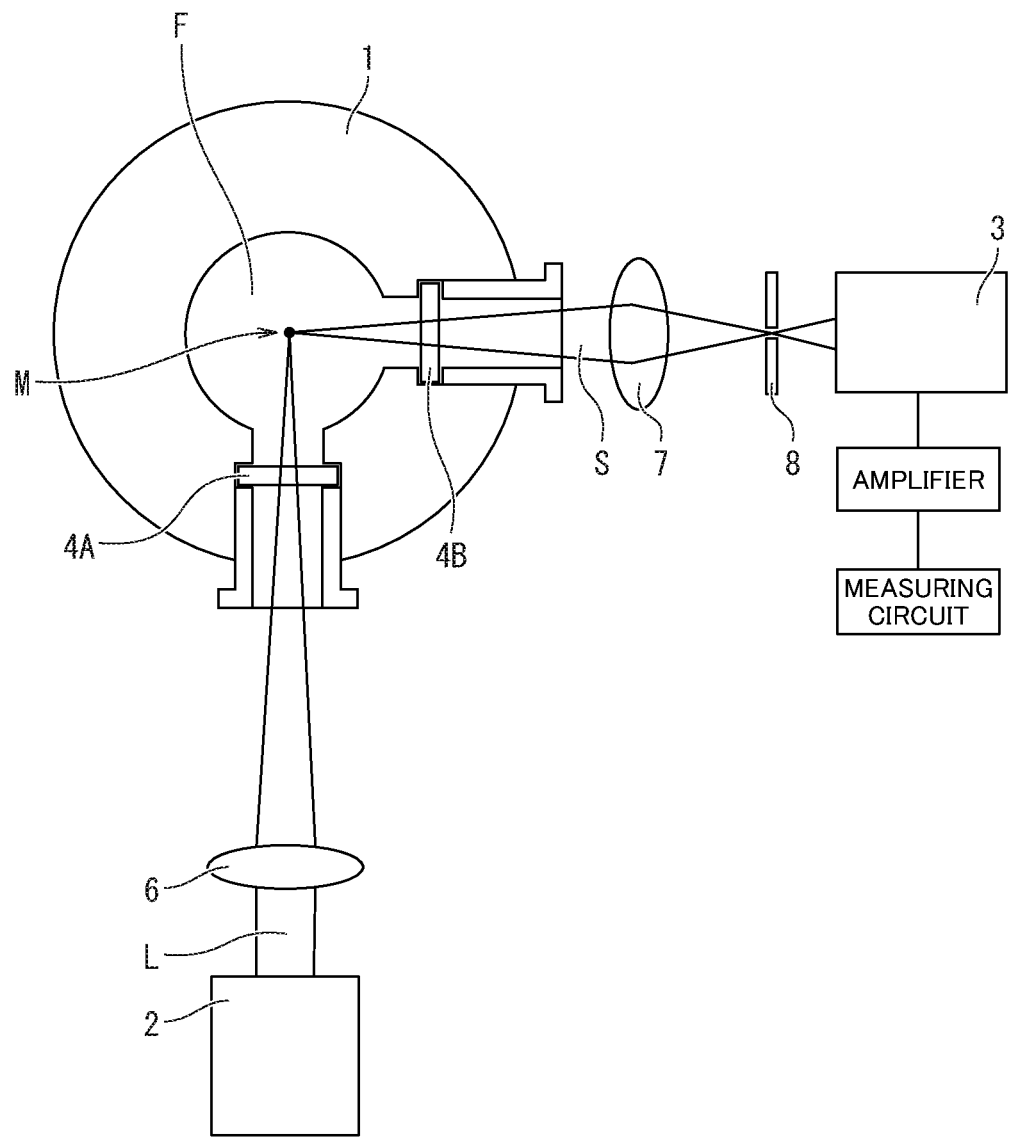
FIG. 1 is a pattern diagram illustrating an example of a light scattering detector that is used as an average particle size measurement unit in a device for producing fluorine gas according to an embodiment of the present invention.

An embodiment of the present invention will be described below. The present embodiment is to describe an example of the present invention, and the present invention is not limited to the present embodiment. In addition, a variety of modifications or improvements can be added to the present embodiment, and aspects to which such modifications or improvements are added can also be included in the present invention.

The present inventors performed intensive studies regarding mist that causes clogging of pipes and valves in the electrolytic synthesis of fluorine gas. The "mist" in the present invention refers to fine liquid particles or fine solid particles that are generated together with fluorine gas in electrolytic cells by electrolysis of electrolytes. Specifically, the mist refers to fine particles of an electrolyte, fine solid particles generated by the phase-change of the fine particles of the electrolyte, and fine particles of a solid generated by a reaction between a member that configures an electrolytic cell (a metal that forms the electrolytic cell, a packing for the electrolytic cell, a carbon electrode, or the like) and fluorine gas.

The present inventors measured the average particle size of mist that was contained in a fluid generated inside an electrolytic cell during electrolysis of an electrolyte and confirmed that the average particle size of the mist changed over time. In addition, as a result of intensive studies, the present inventors found that there was a correlation between the average particle size of the mist and the likelihood of clogging of pipes and valves through which the fluid was sent. In addition, the present inventors found that devising a flow path for sending the fluid generated inside the electrolytic cell depending on the average particle size of the mist made it possible to suppress clogging of the pipes and the valves and to reduce the frequency of interruption or stopping of operation for producing fluorine gas and completed the present invention. An embodiment of the present invention will be described below.

A device for producing fluorine gas of the present embodiment is a device for producing fluorine gas in which an electrolyte containing hydrogen fluoride and a metal fluoride is electrolyzed to produce fluorine gas, the device including an electrolytic cell storing the electrolyte and configured to perform the electrolysis, an average particle size measurement unit configured to measure an average particle size of mist that is contained in a fluid generated inside the electrolytic cell during the electrolysis of the electrolyte, a mist removal unit configured to remove the mist from the fluid, a fluorine gas selection unit configured to select and extract fluorine gas from the fluid, and a flow path configured to send the fluid from an inside of the electrolytic cell to the fluorine gas selection unit. The average particle size measurement unit may be configured to measure the average particle size of mist that is contained in a fluid generated at an anode alone or may be configured to measure the average particle sizes of both of the mist that is contained in the fluid generated at the anode and mist that is contained in a fluid generated at a cathode.

The flow path has a first flow path configured to send the fluid from the inside of the electrolytic cell through the mist removal unit to the fluorine gas selection unit and a second flow path configured to send the fluid from the inside of the electrolytic cell to the fluorine gas selection unit without passing through the mist removal unit. In addition, this flow path has a flow path switching unit configured to switch a flow path through which the fluid flows depending on the average particle size of the mist measured by the average particle size measurement unit.

The flow path switching unit is configured to send the fluid to the first flow path from the inside of the electrolytic cell in a case where the average particle size of the mist measured by the average particle size measurement unit is equal to or less than a predetermined reference value and to send the fluid to the second flow path from the inside of the electrolytic cell in a case where the average particle size of the mist is more than the predetermined reference value. That is, the flow path switching unit is configured such that, in a case where the average particle size of the mist is equal to or less than the predetermined reference value, the fluid is sent to the mist removal unit provided in the first flow path and, in a case where the average particle size of the mist is more than the predetermined reference value, the fluid is not sent to the mist removal unit.

In addition, the second flow path has a clogging suppression mechanism configured to suppress clogging of the second flow path by the mist. The clogging suppression mechanism is not particularly limited as long as the clogging suppression mechanism is capable of suppressing clogging of the second flow path by the mist, and examples thereof include the following mechanisms. That is, a pipe having a large diameter, an inclined pipe, a rotary screw, and an airflow generator can be exemplified, and these may be used in combination.

In more detail, at least a part of the second flow path is configured using a pipe having a larger diameter than the first flow path, whereby clogging of the second flow path by the mist can be suppressed. In addition, at least a part of the second flow path is configured using a pipe that is inclined with respect to the horizontal direction and extends in a direction in which the pipe runs downward from the upstream side toward the downstream side, whereby clogging of the second flow path by the mist can be suppressed.

Furthermore, a rotary screw configured to send the mist accumulated inside the second flow path to the upstream side or the downstream side is installed inside the second flow path, whereby clogging of the second flow path by the mist can be suppressed. Furthermore, an airflow generator configured to cause an airflow for increasing the flow rate of the fluid that flows in the second flow path to flow is provided in the second flow path, whereby clogging of the second flow path by the mist can be suppressed. A mist removal unit other than the mist removal unit provided in the first flow path may be provided in the second flow path as the clogging suppression mechanism.

The first flow path is less likely to be clogged by the mist since the mist is removed from the fluid by the mist removal unit, and the second flow path is less likely to be clogged by the mist since the clogging suppression mechanism is provided. Therefore, the device for producing fluorine gas of the present embodiment is capable of suppressing clogging of pipes or valves by the mist at the time of producing fluorine gas by electrolyzing the electrolyte containing hydrogen fluoride and a metal fluoride. Therefore, it is possible to reduce the frequency of interruption or stopping of operation for producing the fluorine gas, and it is easy to perform continuous operation. Therefore, fluorine gas can be economically produced.

Hereinafter, the device for producing fluorine gas of the present embodiment will be described in more detail.
[Electrolytic Cell]

The aspect of the electrolytic cell is not particularly limited, and any electrolytic cell can be used as long as the electrolyte containing hydrogen fluoride and a metal fluoride can be electrolyzed to generate fluorine gas.

Ordinarily, the inside of the electrolytic cell is divided into an anode chamber in which an anode is disposed and a cathode chamber in which a cathode is disposed by a compartment member such as a partition wall and is configured to prevent fluorine gas that is generated at the anode and hydrogen gas that is generated at the cathode from being mixed.

As the anode, it is possible to use, for example, a carbonaceous electrode formed of a carbon material such as diamond, diamond-like carbon, graphite, or indefinite carbon. In addition, as the anode, in addition to the above-described carbon materials, for example, a metal electrode formed of a metal such as nickel or MONEL (trademark) can also be used. As the cathode, it is possible to use, for example, a metal electrode formed of a metal such as iron, copper, nickel, or MONEL (trademark).

As the electrolyte, it is possible to use, for example, a mixed molten salt of hydrogen fluoride (HF) and potassium fluoride (KF). The mole ratio between hydrogen fluoride and potassium fluoride in the mixed molten salt of hydrogen fluoride and potassium fluoride can be set to, for example, hydrogen fluoride:potassium fluoride=1.5 to 2.5:1. A typical electrolyte is KF·2HF where the ratio of hydrogen fluoride to potassium fluoride is 2:1, and the melting point of this mixed molten salt is about 72° C. Since this electrolyte is corrosive, apart that comes into contact with the electrolyte, such as the inner surface of the electrolytic cell, is preferably formed of a metal such as iron, nickel, or MONEL (trademark).

At the time of the electrolysis of the electrolyte, a direct current is applied between the anode and the cathode, a gas containing fluorine gas is generated at the anode, and a gas containing hydrogen gas is generated at the cathode. In addition, since hydrogen fluoride in the electrolyte has a vapor pressure, the gases that are generated at the anode and the cathode are each accompanied by hydrogen fluoride. Furthermore, in the production of fluorine gas by the electrolysis of the electrolyte, the gases that are generated by the electrolysis contain mist of the electrolyte. Therefore, a gas-phase portion of the electrolytic cell is made up of the gases that are generated by the electrolysis, hydrogen fluoride, and the mist of the electrolyte. Therefore, what is sent out from the inside of the electrolytic cell to the outside is made up of the gases that are generated by the electrolysis, hydrogen fluoride, and the mist of the electrolyte, which is referred to as "fluid" in the present invention.

Since hydrogen fluoride in the electrolyte is consumed by the progress of the electrolysis, a pipe for continuously or intermittently supplying hydrogen fluoride to the electrolytic cell for replenishment may be connected to the electrolytic cell. Hydrogen fluoride may be supplied to the cathode chamber side of the electrolytic cell or may be supplied to the anode chamber side.

A main reason for the generation of mist during the electrolysis of the electrolyte is as follows. The temperature of the electrolyte during the electrolysis is adjusted to, for example, 80° C. to 100° C. Since the melting point of KF·2HF is 71.7° C., the electrolyte is in a liquid state in a case where the temperature of the electrolyte is adjusted to the above-described temperature. Air bubbles of the gases that are generated at both electrodes of the electrolytic cell move upward in the electrolyte and burst on the liquid surface of the electrolyte. At this time, a part of the electrolyte is released into the gas phase.

Since the temperature of the gas phase is lower than the melting point of the electrolyte, the released electrolyte undergoes a phase change to a microfine particle-like state. These fine particles are considered as a mixture KF·nHF of potassium fluoride and hydrogen fluoride. These fine particles turn into mist in the flow of a separately generated gas and form a fluid that is generated in the electrolytic cell. Since such mist has tackiness and the like, it is difficult to effectively remove the mist with an ordinary measure such as the installment of a filter.

In addition, while the amount generated is small, there is also a case where fine particles of an organic compound are generated as mist by a reaction between the carbonaceous electrode, which is the anode, and the fluorine gas generated by the electrolysis. In detail, a contact resistance is often generated in an electric current supply portion to the carbonaceous electrode, and there is a case where the temperature of the portion becomes higher than the temperature of the electrolyte due to Joule heat. Therefore, there is a case where a soot-like organic compound CFx is generated as mist by a reaction between carbon that forms the carbonaceous electrode and the fluorine gas.

[Average Particle Size Measurement Unit]

The device for producing fluorine gas of the present embodiment includes the average particle size measurement unit configured to measure the average particle size of the mist that is contained in the fluid, and this average particle size measurement unit may include a light scattering detector configured to measure the average particle size by a light scattering method. The light scattering detector is capable of measuring the average particle size of the mist in the fluid that flows in the flow path while the device for producing fluorine gas is continuously operated and is thus preferable as the average particle size measurement unit.

An example of the light scattering detector will be described with reference to FIG. 1. The light scattering detector of FIG. 1 is a light scattering detector that can be used as the average particle size measurement unit in the device for producing fluorine gas of the present embodiment (for example, devices for producing fluorine gas of FIG. 2 and FIGS. 4 to 13 illustrated below). That is, the light scattering detector is a light scattering detector configured to measure the average particle size of the mist that is contained in the fluid generated inside the electrolytic cell at the time of producing fluorine gas by electrolyzing the electrolyte containing hydrogen fluoride and a metal fluoride inside the electrolytic cell of the device for producing fluorine gas.

The average particle size of the mist may be measured by connecting the light scattering detector to the device for producing fluorine gas and sending the fluid from the inside of the electrolytic cell to the light scattering detector or the average particle size of the mist may be measured by extracting the fluid from the inside of the electrolytic cell and introducing the fluid into the light scattering detector without connecting the light scattering detector to the device for producing fluorine gas.

The light scattering detector of FIG. 1 includes a sample chamber 1 configured to store a fluid F, a light source 2 configured to irradiates the fluid F in the sample chamber 1 with light for light scattering measurement L, a scattered light detection unit 3 configured to detect scattered light S generated by scattering of the light for light scattering measurement L by mist M in the fluid F, a transparent window 4A that is installed in the sample chamber 1 to come into contact with the fluid F and configured to transmit the light for light scattering measurement L, and a transparent window 4B that is installed in the sample chamber 1 to come into contact with the fluid F and configured to transmit the scattered light S. The transparent windows 4A and 4B are formed of at least one selected from diamond, calcium fluoride ($CaF_2$), potassium fluoride (KF), silver fluoride (AgF), barium fluoride ($BaF_2$), and potassium bromide (KBr).

The light for light scattering measurement L (for example, laser light) emitted from the light source 2 passes through a converging lens 6 and the transparent window 4A of the sample chamber 1, enters the sample chamber 1, and irradiates the fluid F stored in the sample chamber 1. At this time, if a substance that reflects light such as the mist M is present in the fluid F, the light for light scattering measurement L is reflected and scattered. A part of the scattered light S generated by the scattering of the light for light scattering measurement L by the mist M is transmitted through the transparent window 4B of the sample chamber 1 and extracted from the sample chamber 1 and enters the scattered light detection unit 3 through a condensing lens 7 and a diaphragm 8. At this time, it is possible to learn the average particle size of the mist M from information that can be obtained from the scattered light S. The average particle size that is obtained here is the number average particle size. As the scattered light detection unit 3, it is possible to use, for example, an aerosol spectrometer WELAS (registered trademark) digital 2000 manufactured by Palas GmbH.

The transparent windows 4A and 4B come into contact with the fluid F, but the fluid F contains a highly reactive fluorine gas, and thus the transparent windows 4A and 4B need to be formed of a material that is not easily corroded by the fluorine gas. As the material that forms the transparent windows 4A and 4B, at least one selected from diamond, calcium fluoride, potassium fluoride, silver fluoride, barium fluoride, and potassium bromide is exemplified. When the transparent windows 4A and 4B are formed of the above-described material, it is possible to suppress deterioration caused by the contact with the fluid F.

In addition, glass such as quartz coated with a coating made of the above-described material on the surface can also be used as the transparent windows 4A and 4B. Since the portion that comes into contact with the fluid F is coated with a coating made of the above-described material, it is possible to suppress deterioration caused by the contact with the fluid F while suppressing the cost. The transparent windows 4A and 4B each may be a laminate in which the surface that comes into contact with the fluid F is formed of the above-described material and the other portions are formed of ordinary glass such as quartz.

A material for portions other than the transparent windows 4A and 4B in the light scattering detector is not particularly limited as long as the material has corrosion resistance to fluorine gas, and a metallic material, for example, MONEL (trademark), which is a copper-nickel alloy, HASTELLOY (trademark), stainless steel, or the like is preferably used.

[Average Particle Size of Mist]

The present inventors measured the average particle size of mist that was generated at the time of producing fluorine gas by electrolysis of an electrolyte using a light scattering detector. An example of the result will be described. Electrolysis began after the anode of the device for producing fluorine gas was replaced with a new anode or the inside of the electrolytic cell was filled with a new electrolyte, and the average particle sizes of mist in a fluid that was generated at the anode for a certain period immediately after the beginning of the electrolysis was measured. As a result, the average particle size of the mist was 0.5 µm to 2.0 µm. After that, when the electrolysis was continued and a sufficient time elapsed, the electrolysis began to be stable, and the average particle size of the mist in the fluid during this stable electrolysis was about 0.2 µm.

As described above, mist having a relatively large particle size is generated from immediately after the beginning of the electrolysis to the stable electrolysis. In a case where a fluid containing large mist generated immediately after the beginning of the electrolysis flows in a pipe or a valve, the mist is adsorbed to the inner surface of the pipe or valve, which makes it likely for the pipe or valve to be clogged.

On the other hand, during the stable electrolysis, the particle size of mist being generated is relatively small. Such small mist is less likely to settle, be accumulated, or the like in the fluid and is thus capable of stably flowing in pipes or valves. Therefore, during the stable electrolysis, the likelihood of a fluid made up of the mist and gases generated at the electrodes causing clogging of pipes and valves is relatively low. The time from the beginning of the electrolysis to the stable electrolysis is ordinarily 25 hours or longer and 200 hours or shorter. In addition, from the beginning of the electrolysis to the stable electrolysis, it is necessary to conduct electricity of about 40 kAh or more per 1000 L of the electrolyte.

Based on the above-described finding, the present inventors invented the device for producing fluorine gas having a structure in which a flow path through which the fluid flows can be switched depending on the average particle size of the mist measured by the light scattering detector. The device for producing fluorine gas of the present embodiment has the first flow path and the second flow path and may be configured to select, between the two flow paths, a flow path that is used for the transport of the fluid using the flow path switching unit (for example, a switching valve).

Alternatively, the device for producing fluorine gas of the present embodiment may have two flow paths and a transfer and replacement mechanism configured to transfer and replace the electrolytic cell and may be configured to select, between the two flow paths, a flow path that is used for the transport of the fluid, transfer the electrolytic cell to the vicinity of the flow path, and connect the electrolytic cell to the flow path, thereby switching the flow paths.

Since the device for producing fluorine gas has the first flow path and the second flow path as described above, even while one flow path is shut and cleaned, the device for producing fluorine gas can be continuously operated by opening the other flow path.

From the studies by the present inventors, mist having a relatively large average particle size is generated from immediately after the beginning of the electrolysis to the stable electrolysis, and thus the fluid may be sent to the second flow path having the clogging suppression mechanism during this time. When time elapses and the electrolysis has become stable, since mist having a relatively small average particle size is generated, at this time, the flow paths may be switched to send the fluid to the first flow path having the mist removal unit.

The flow paths are switched as described above depending on the average particle size of the mist measured by the light scattering detector, and the flow paths are switched based on a predetermined reference value. While varying with devices, the appropriate reference value for the mist that is generated at the anode is, for example, 0.1 µm or more and 1.0 µm or less, preferably 0.2 µm or more and 0.8 µm or less, and more preferably 0.4 µm. In a case where the average particle size of the mist measured by the light scattering detector is more than the reference value, the fluid is sent to the second flow path, and, in a case where the average particle size is equal to or less than the reference value, the fluid can be sent to the first flow path.

The average particle size of mist that is contained in the fluid that is generated at the cathode (the main component is hydrogen gas) may also be measured. The fluid that is generated at the cathode contains, for example, 20 to 50 µg of fine particles per unit volume (1 liter) (calculated with an assumption that the specific gravity of the mist is 1.0 g/mL), and these fine particles have an average particle size of about 0.1 µm with a distribution of ±0.05 µm.

In the fluid that is generated at the cathode, a large difference in the particle size distribution of the fine particles being generated that depends on the concentration of moisture contained in the electrolyte was not admitted. The mist contained in the fluid that is generated at the cathode has a smaller average particle size than the mist contained in the fluid that is generated at the anode and is thus unlikely to cause clogging of pipes or valves compared with the mist that is contained in the fluid that is generated at the anode. Therefore, the mist contained in the fluid that is generated at the cathode may be removed from the fluid using an appropriate removing method.

An example of the device for producing fluorine gas of the present embodiment will be described in detail with reference to FIG. 2. A device for producing fluorine gas of FIG. 2 is an example in which two electrolytic cells are provided, but the number of the electrolytic cells may be one, may be three or more, and may be, for example, 10 to 15.

Figure 2:
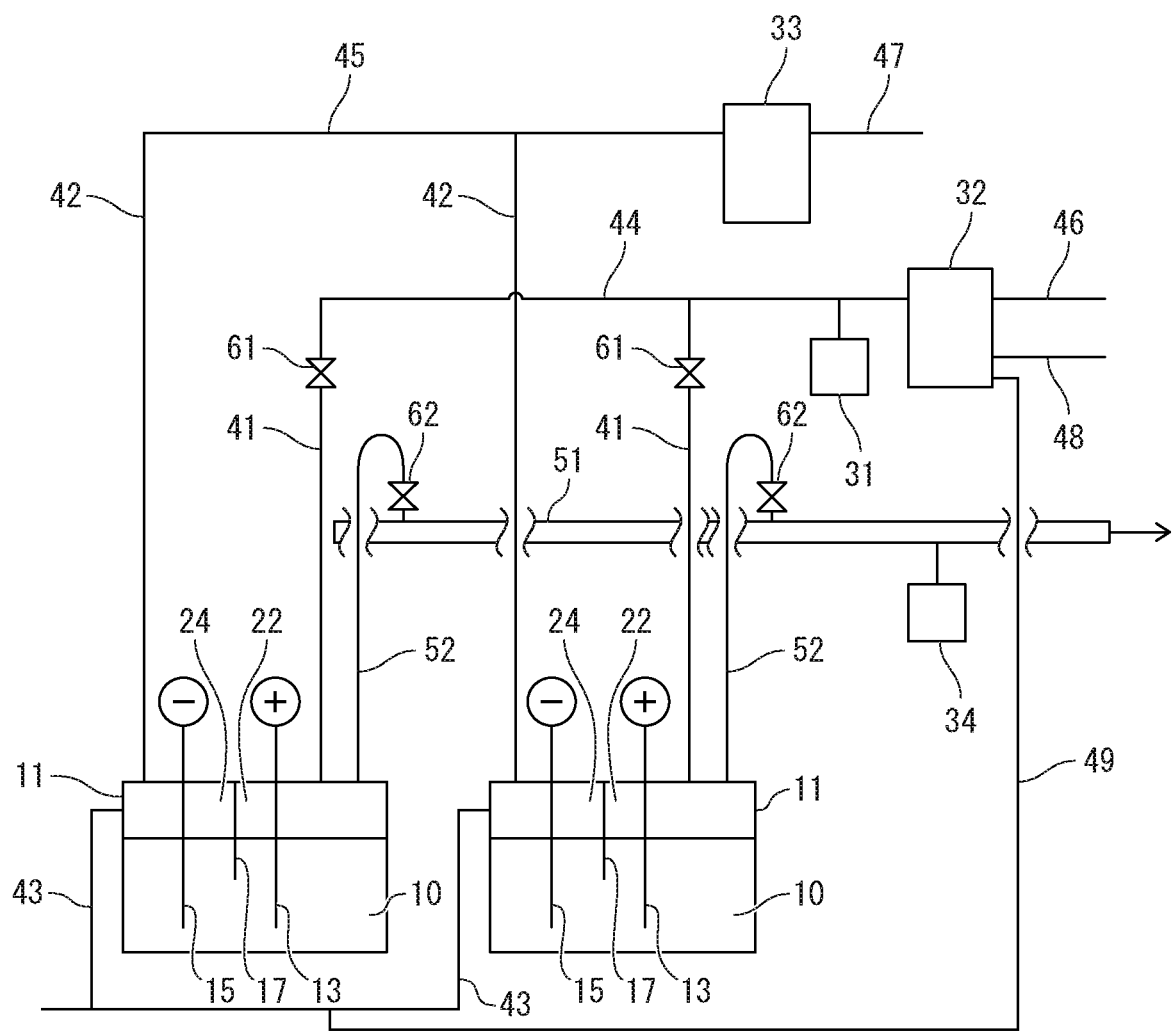
FIG. 2 is a schematic view illustrating an example of a device for producing fluorine gas according to an embodiment of the present invention.

The device for producing fluorine gas illustrated in FIG. 2 includes electrolytic cells 11 and 11 where an electrolyte 10 is stored inside and electrolysis is performed, anodes 13 that are disposed inside the electrolytic cells 11 and immersed in the electrolytes 10, and cathodes 15 that are disposed inside the electrolytic cells 11, immersed in the electrolytes 10, and disposed to face the anodes 13.

The inside of the electrolytic cell 11 is divided into an anode chamber 22 and a cathode chamber 24 by a partition wall 17 that extends downward in the vertical direction from the ceiling surface inside the electrolytic cell 11 and is immersed in the electrolyte 10 at the lower end. In addition, the anode 13 is disposed in the anode chamber 22, and the cathode 15 is disposed in the cathode chamber 24. The space above the liquid surface of the electrolyte 10 is separated into a space in the anode chamber 22 and a space in the cathode chamber 24 by the partition wall 17, and a portion of the electrolyte 10 on the upper side of the lower end of the partition wall 17 is separated by the partition wall 17, but a portion of the electrolyte 10 on the lower side of the lower end of the partition wall 17 is not directly separated by the partition wall 17 and is continuous.

In addition, the device for producing fluorine gas illustrated in FIG. 2 includes a first average particle size measurement unit 31 configured to measure the average particle size of mist that is contained in a fluid generated inside the electrolytic cell 11 during the electrolysis of the electrolyte 10, a first mist removal unit 32 configured to remove the mist from the fluid, a fluorine gas selection unit (not illustrated) configured to select and extract fluorine gas from the fluid, and a flow path configured to send the fluid from the inside of the electrolytic cell 11 to the fluorine gas selection unit.

Furthermore, this flow path has a first flow path configured to send the fluid from the inside of the electrolytic cell 11 through the first mist removal unit 32 to the fluorine gas selection unit and a second flow path configured to send the fluid from the inside of the electrolytic cell 11 to the fluorine gas selection unit without passing through the first mist removal unit 32. In addition, this flow path has a flow path switching unit configured to switch a flow path through which the fluid flows to the first flow path or the second flow path depending on the average particle size of the mist measured by the first average particle size measurement unit 31. That is, the flow path switching unit is provided in the middle of the flow path that extends from the electrolytic cell 11 and configured to change the flow path through which the fluid flows.

This flow path switching unit is configured to send the fluid to the first flow path from the inside of the electrolytic cell 11 in a case where the average particle size of the mist measured by the first average particle size measurement unit 31 is equal to or less than a predetermined reference value and to send the fluid to the second flow path from the inside of the electrolytic cell 11 in a case where the average particle size of the mist is more than the predetermined reference value. In addition, the second flow path has a clogging suppression mechanism configured to suppress clogging of the second flow path by the mist.

That is, in a case where the average particle size of the mist is equal to or less than the reference value, the electrolytic cell 11 and the fluorine gas selection unit are linked and the fluid is sent to the first flow path in which the first mist removal unit 32 is provided. In a case where the average particle size of the mist is more than the reference value, the electrolytic cell 11 and the fluorine gas selection unit are linked and the fluid is sent to the second flow path in which the clogging suppression mechanism is provided.

As the first average particle size measurement unit 31, it is possible to use, for example, the above-described light scattering detector illustrated in FIG. 1.

As the first mist removal unit 32, for example, a mist remover capable of removing mist having an average particle size of 0.4 $\mu$m or less from the fluid is used. The type of the mist remover, that is, the method for removing the mist is not particularly limited; however, since the average particle size of the mist is small, it is possible to use, for example, an electric dust collector, a venturi scrubber, or a filter as the mist remover.

Figure 3:
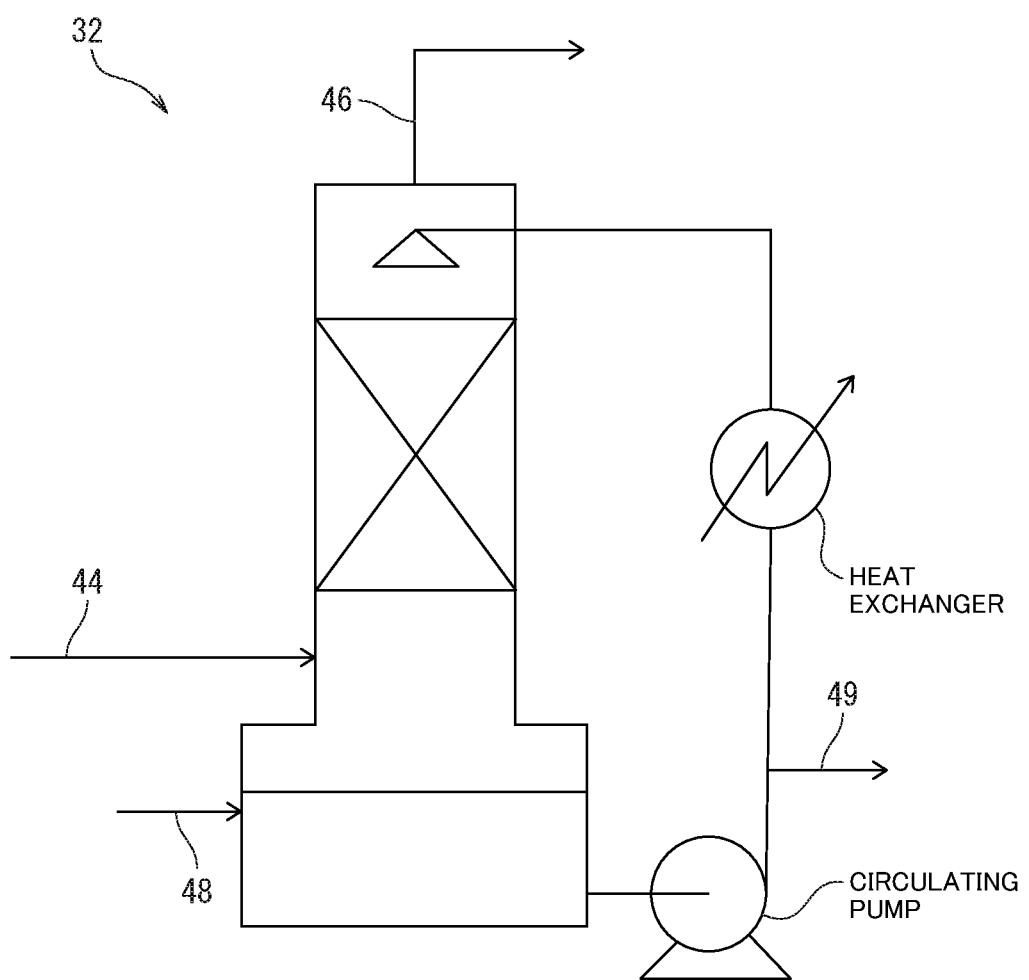
FIG. 3 is a pattern diagram illustrating an example of a mist remover that is used as a mist removal unit in the device for producing fluorine gas of FIG. 2.

Among the above-described mist removers, a mist remover illustrated in FIG. 3 is preferably used. The mist remover illustrated in FIG. 3 is a scrubber-type mist remover in which liquid hydrogen fluoride is used as a circulating fluid. The mist remover illustrated in FIG. 3 is capable of efficiently removing mist having an average particle size of 0.4 $\mu$m or less from a fluid. In addition, although liquid hydrogen fluoride is used as the circulating fluid, it is preferable to cool the circulating fluid to decrease the concentration of hydrogen fluoride in the fluorine gas, and thus it is possible to adjust the concentration of hydrogen fluoride in the fluorine gas by controlling the cooling temperature.

The device for producing fluorine gas illustrated in FIG. 2 will be described in more detail. A first pipe 41 configured to send a fluid that is generated in the anode chamber 22 of the electrolytic cell 11 (hereinafter, also referred to as "anode gas") to the outside communicates the electrolytic cell 11 and a fourth pipe 44, and the anode gases sent out from the two electrolytic cells 11 and 11 are sent to the fourth pipe 44 through the first pipes 41 and mixed. The main component of the anode gas is fluorine gas, and subsidiary components are mist, hydrogen fluoride, carbon tetrafluoride, an oxygen gas, and water.

The fourth pipe 44 is connected to the first mist removal unit 32, and the anode gas is sent to the first mist removal unit 32 through the fourth pipe 44. Therefore, the mist and the hydrogen fluoride in the anode gas are removed from the anode gas by the first mist removal unit 32. The anode gas from which the mist and the hydrogen fluoride have been removed is sent from the first mist removal unit 32 to a fluorine gas selection unit, not illustrated, through a sixth pipe 46 connected to the first mist removal unit 32. Then, the fluorine gas is selected and extracted from the anode gas with the fluorine gas selection unit.

An eighth pipe 48 is connected to the first mist removal unit 32, and the liquid hydrogen fluoride, which is the circulating fluid, is supplied to the first mist removal unit 32 through the eighth pipe 48. Furthermore, a ninth pipe 49 is connected to the first mist removal unit 32. The ninth pipe 49 is connected to the electrolytic cells 11 and 11 through third pipes 43, and the circulating fluid (liquid hydrogen fluoride) that has been used in the first mist removal unit 32 to remove the mist and contains the mist is returned from the first mist removal unit 32 to the electrolytic cells 11 and 11.

The description of the anode chamber 22 is also true for the cathode chamber 24 of the electrolytic cell 11. That is, a second pipe 42 configured to send a fluid that is generated in the cathode chamber 24 of the electrolytic cell 11 (hereinafter, also referred to as "cathode gas") to the outside communicates the electrolytic cell 11 and a fifth pipe 45, and the cathode gases sent out from the two electrolytic cells 11 and 11 are sent to the fifth pipe 45 through the second pipes 42 and mixed. The main component of the cathode gas is hydrogen gas, and subsidiary components are mist, hydrogen fluoride, and water.

Since the cathode gas contains fine mist and 5 to 10% by volume of hydrogen fluoride, it is not preferable to discharge the cathode gas to the atmosphere as it is. Therefore, the fifth pipe 45 is connected to a second mist removal unit 33, and the cathode gas is sent to the second mist removal unit 33 through the fifth pipe 45. Therefore, the mist and the hydrogen fluoride in the cathode gas are removed from the cathode gas by the second mist removal unit 33. The cathode gas from which the mist and the hydrogen fluoride have been removed is discharged to the atmosphere from the second mist removal unit 33 through a seventh pipe 47 connected to the second mist removal unit 33. The type of the second mist removal unit 33, that is, the method for removing the mist is not particularly limited, and it is possible to use a scrubber-type mist remover in which an alkaline aqueous solution is used as a circulating fluid.

The pipe diameters or installation directions (which mean the directions in which the pipes extend, for example, the vertical direction and the horizontal direction) of the first pipes 41, the second pipes 42, the fourth pipe 44, and the fifth pipe 45 are not particularly limited, but it is preferable that the first pipes 41 and the second pipes 42 are installed to extend along the vertical direction from the electrolytic cells 11 and have pipe diameters in which the flow rates of the fluids that flow in the first pipes 41 and the second pipes 42 become 30 cm/sec or slower in a standard state. In such a case, even in a case where the mist that is contained in the fluid falls due to its own weight, since the mist settles in the electrolytic cell 11, the insides of the first pipe 41 and the second pipe 42 are less likely to be clogged by fine particles.

In addition, it is preferable that the fourth pipe 44 and the fifth pipe 45 are installed to extend along the horizontal direction and have pipe diameters in which the flow rates of the fluids that flow in the fourth pipe 44 and the fifth pipe 45 become as fast as or faster up to about 10 times the flow rates in the first pipe 41 and the second pipe 42.

Furthermore, in addition to the first pipes 41, second bypass pipes 52 for sending the anode gas to the outside of the electrolytic cells 11 are provided. That is, the second bypass pipes 52 communicate the electrolytic cells 11 and a first bypass pipe 51, and the anode gases sent out from the two electrolytic cells 11 and 11 are sent to the first bypass pipe 51 through the second bypass pipes 52 and mixed. Furthermore, the anode gas is sent out to the fluorine gas selection unit, not illustrated, through the first bypass pipe 51. Then, the fluorine gas is selected and extracted from the anode gas by the fluorine gas selection unit. The fluorine gas selection unit connected to the first bypass pipe 51 and the fluorine gas selection unit connected to the sixth pipe 46 may be the same or different.

The pipe diameter or installation direction of the second bypass pipe 52 is not particularly limited, but it is preferable that the second bypass pipe 52 is installed to extend along the vertical direction from the electrolytic cell 11 and has a pipe diameter in which the flow rate of the fluid that flows in the second bypass pipe 52 becomes 30 cm/sec or slower in a standard state.

In addition, the first bypass pipe 51 is installed to extend along the horizontal direction. Furthermore, the first bypass pipe 51 is a pipe having a larger pipe diameter than the fourth pipe 44, and the pipe diameter of the first bypass pipe 51 is set such that the first bypass pipe 51 is less likely to be clogged due to accumulation of fine particles. The first bypass pipe 51 is a pipe having a larger pipe diameter than the fourth pipe 44, whereby the clogging suppression mechanism is configured.

The pipe diameter of the first bypass pipe 51 is preferably more than 1.0 time to 3.2 times or less and more preferably 1.05 times or more and 1.5 times or less the pipe diameter of the fourth pipe 44. That is, the flow path cross-sectional area of the first bypass pipe 51 is preferably 10 times or less that of the fourth pipe 44.

As is clear from the above description, the first pipes 41 and the fourth pipe 44 configure the first flow path, and the first bypass pipe 51 and the second bypass pipes 52 configure the second flow path. In addition, the clogging suppression mechanism is provided in the first bypass pipe 51 that configures the second flow path.

Next, the flow path switching unit will be described. A first pipe valve 61 is installed in each of the first pipes 41. The first pipe valve 61 is switched to an open state or a closed state, whereby it is possible to control whether or not the anode gas can be sent from the electrolytic cell 11 to the first mist removal unit 32. In addition, a bypass valve 62 is installed in each of the second bypass pipes 52. The bypass valve 62 is switched to an open state or a closed state, whereby it is possible to control whether or not the anode gas can be sent from the electrolytic cell 11 to the first bypass pipe 51.

Furthermore, the first average particle size measurement unit 31 is installed between the electrolytic cells 11 and the first mist removal unit 32, in detail, in an intermediate portion of the fourth pipe 44 and on the downstream side of linking portions with the first pipes 41. In addition, the first average particle size measurement unit 31 is configured to measure the average particle size of the mist that is contained in the anode gas that flows in the fourth pipe 44. Furthermore, the fluorine gas and the nitrogen gas that are contained in the anode gas are analyzed after the measurement of the average particle size of the mist, whereby it is possible to measure the current efficiency in the production of fluorine gas. Similarly, a second average particle size measurement unit 34 is also installed in an intermediate portion of the first bypass pipe 51 and on the downstream side of linking portions with the second bypass pipes 52, and the second average particle size measurement unit 34 is configured to measure the average particle size of the mist that is contained in the anode gas that flows in the first bypass pipe 51.

The average particle size of the mist is measured with the first average particle size measurement unit 31 (the average particle size of the mist may also be measured with the second average particle size measurement unit 34 at the same time), and, in a case where the measurement result is more than the predetermined reference value, the bypass valves 62 are switched to an open state to send the anode gases from the electrolytic cells 11 to the first bypass pipe 51, and the first pipe valves 61 are switched to a closed state to prevent the anode gases from being sent to the fourth pipe 44 and the first mist removal unit 32. That is, the anode gases are sent to the second flow path.

On the other hand, in a case where the measurement result is equal to or less than the predetermined reference value, the first pipe valves 61 are switched to an open state to send the anode gases to the fourth pipe 44 and the first mist removal unit 32, and the bypass valves 62 are switched to a closed state to prevent the anode gases from being sent from the electrolytic cells 11 to the first bypass pipe 51. That is, the anode gases are sent to the first flow path.

As is clear from the above description, the first pipe valves 61 and the bypass valves 62 configure the above-described flow path switching unit.

As described above, the device for producing fluorine gas is operated while the flow paths are switched depending on the average particle size of the mist, whereby it is possible to smoothly and continuously operate the device for producing fluorine gas while suppressing clogging of pipes and valves due to mist. Therefore, with the device for producing fluorine gas illustrated in FIG. 2, it is possible to economically produce fluorine gas.

For example, a plurality of pipes each having a filter installed therein may be prepared as mist removal units, and electrolysis may be performed while appropriately switching the pipes and replacing the filters.

Furthermore, a period during which the filters need to be replaced frequently and a period during which the filters do not need to be replaced frequently may be determined based on measurement by a light scattering detector that is applied as the average particle size measurement unit. Then, the switching frequency of the pipes through which the fluid flows is appropriately adjusted based on the above-described determination, whereby it is possible to efficiently and continuously operate the device for producing fluorine gas.

Next, modification examples of the device for producing fluorine gas illustrated in FIG. 2 will be described.

FIRST MODIFICATION EXAMPLE

Figure 4:
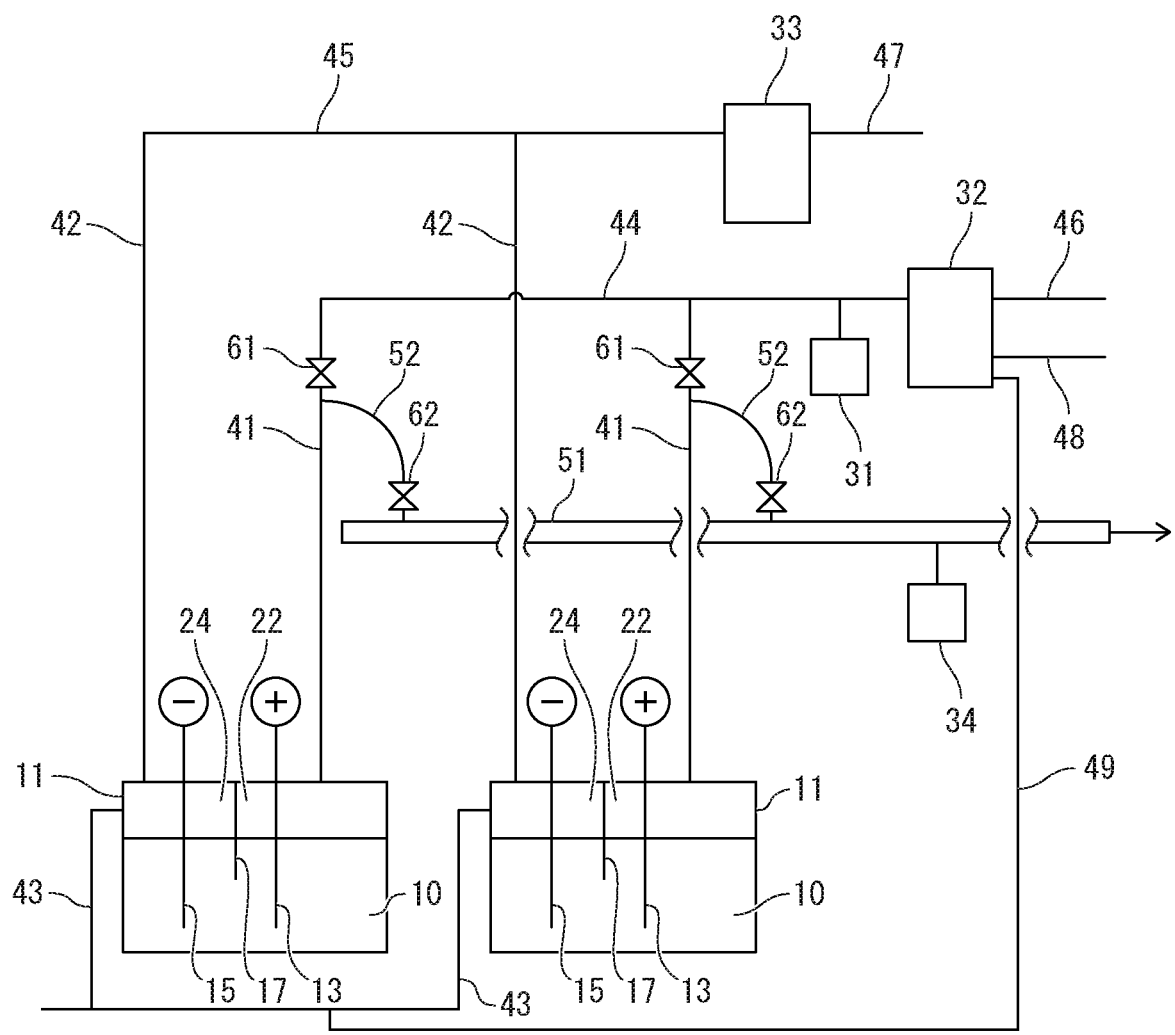
FIG. 4 is a schematic view illustrating a first modification example of the device for producing fluorine gas of FIG. 2.

A first modification example will be described with reference to FIG. 4. In the device for producing fluorine gas illustrated in FIG. 2, the second bypass pipe 52 links the electrolytic cell 11 and the first bypass pipe 51; however, in a device for producing fluorine gas of the first modification example illustrated in FIG. 4, the second bypass pipe 52 links the first pipe 41 and the first bypass pipe 51. Since the configuration of the device for producing fluorine gas of the first modification example is almost the same as the configuration of the device for producing fluorine gas of FIG. 2 except for the above-described point, the same portions will not be described.

SECOND MODIFICATION EXAMPLE

Figure 5:
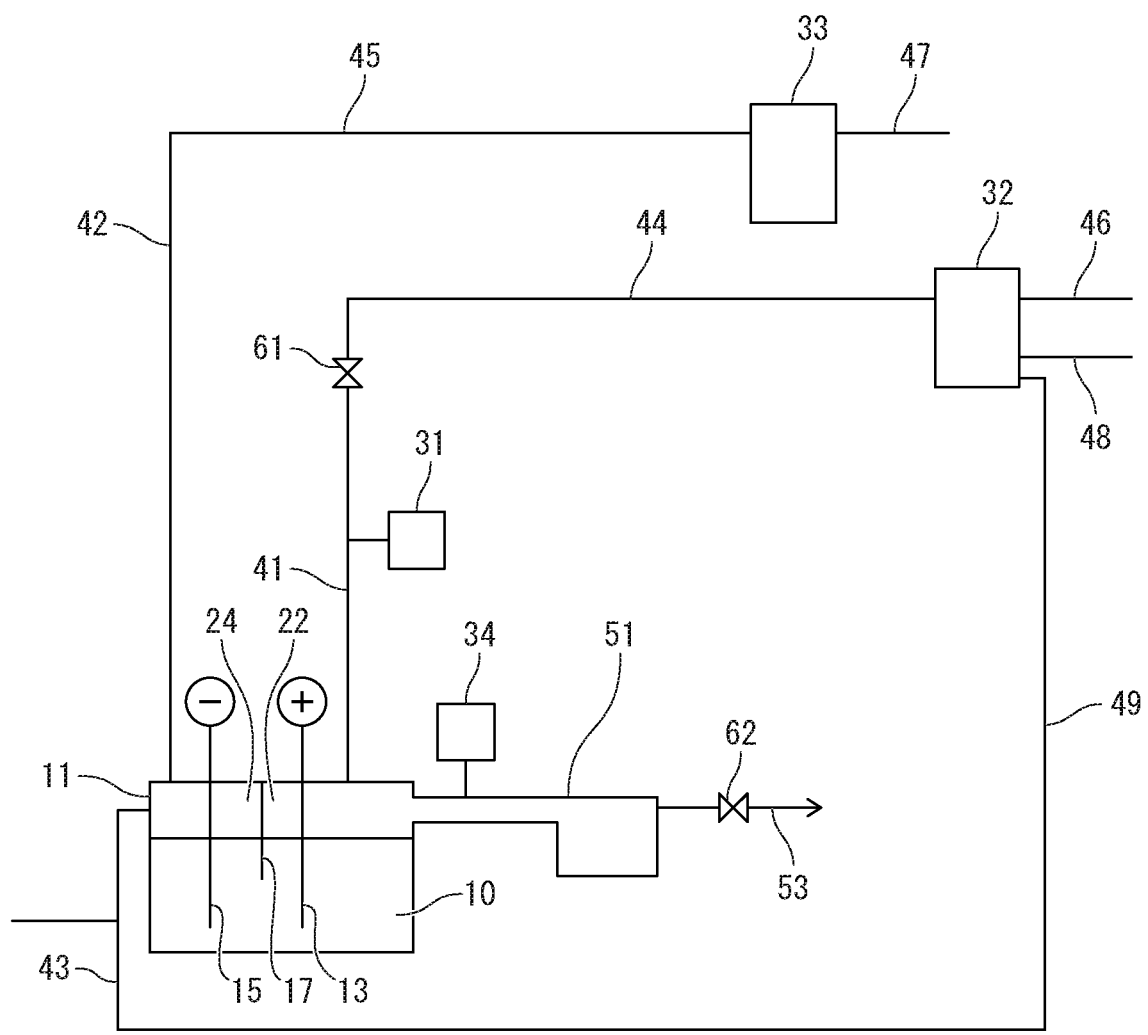
FIG. 5 is a schematic view illustrating a second modification example of the device for producing fluorine gas of FIG. 2.

A second modification example will be described with reference to FIG. 5. A device for producing fluorine gas of the second modification example illustrated in FIG. 5 is an example in which one electrolytic cell 11 is provided. The first average particle size measurement unit 31 is provided not in the fourth pipe 44 but in the first pipe 41 and is provided on the upstream side of the first pipe valve 61. The second bypass pipe 52 is not provided, and the first bypass pipe 51 is directly connected to the electrolytic cell 11 without passing through the second bypass pipe 52.

In addition, the first bypass pipe 51 has a larger diameter than the fourth pipe 44 and thus functions as a clogging suppression mechanism. Furthermore, for example, a mist pool space is installed at the downstream end of the first bypass pipe 51, whereby it is possible to further increase the clogging suppressing effect. Examples of the mist pool space include a space obtained by forming the downstream end portion of the first bypass pipe 51 in a larger pipe diameter than the central portion in the installation direction (for example, a pipe diameter four times or more that at the central portion in the installation direction) or a space obtained by forming the downstream end portion of the first bypass pipe 51 in a shape like a container, and the mist pool space makes it possible to suppress clogging of the first bypass pipe 51. This configuration is intended to obtain a clogging preventing effect attributed to the large flow path cross-sectional area and a clogging preventing effect resulting from the use of the gravity fall of the mist caused by a decrease in the linear velocity of the gas flow.

Furthermore, the bypass valve 62 is provided in a third bypass pipe 53 that connects the first bypass pipe 51 and a fluorine gas selection unit, not illustrated. Since the configuration of the device for producing fluorine gas of the second modification example is almost the same as the configuration of the device for producing fluorine gas of FIG. 2 except for the above-described point, the same portions will not be described.

THIRD MODIFICATION EXAMPLE

Figure 6:
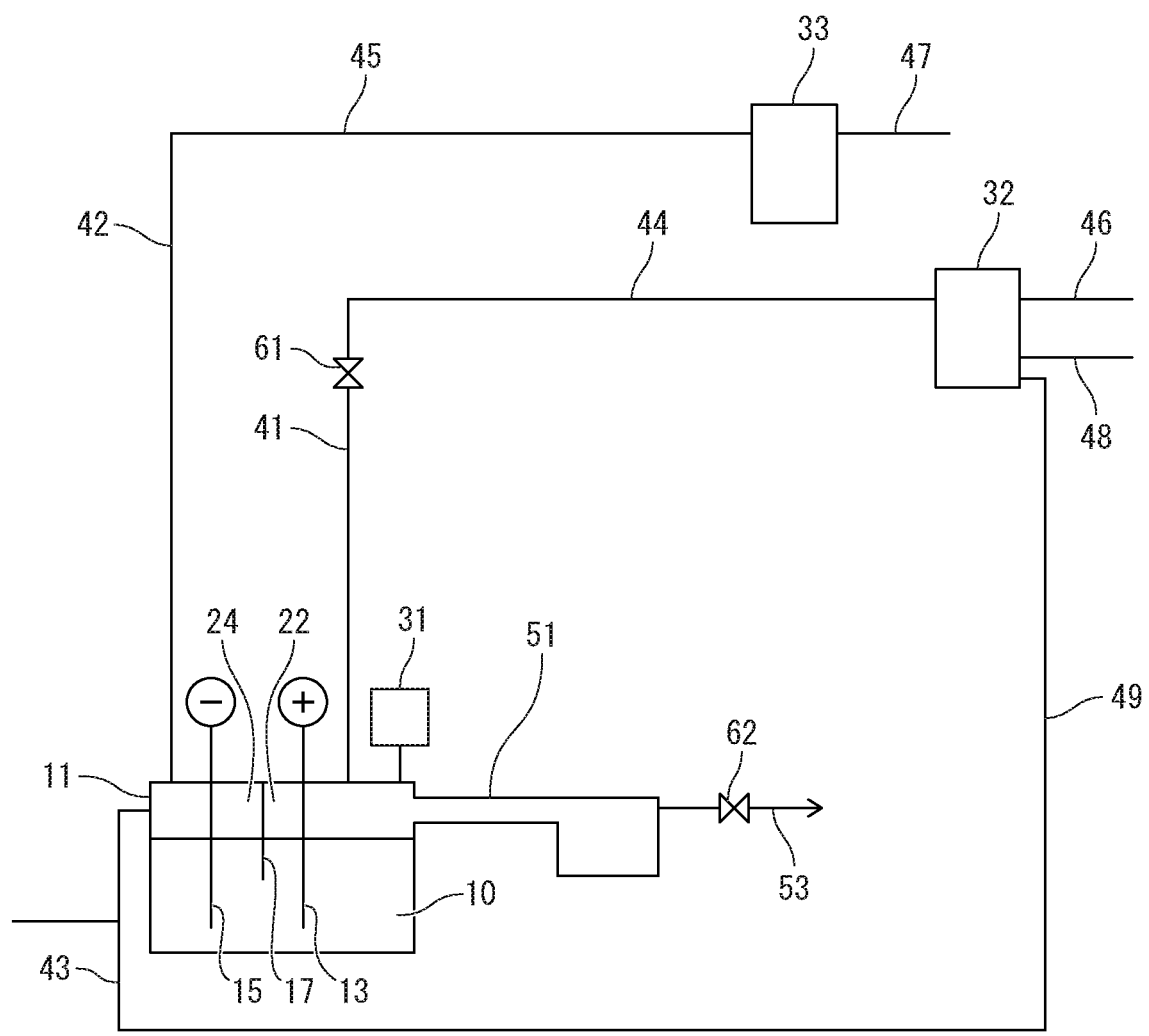
FIG. 6 is a schematic view illustrating a third modification example of the device for producing fluorine gas of FIG. 2.

A third modification example will be described with reference to FIG. 6. In a device for producing fluorine gas of the third modification example, the first average particle size measurement unit 31 is provided in the electrolytic cell 11, the anode gas inside the electrolytic cell 11 is directly introduced into the first average particle size measurement unit 31, and the average particle size of mist is measured. The device for producing fluorine gas of the third modification example does not have the second average particle size measurement unit 34. Since the configuration of the device for producing fluorine gas of the third modification example is almost the same as the configuration of the device for producing fluorine gas of the second modification example except for the above-described point, the same portions will not be described.

FOURTH MODIFICATION EXAMPLE

Figure 7:
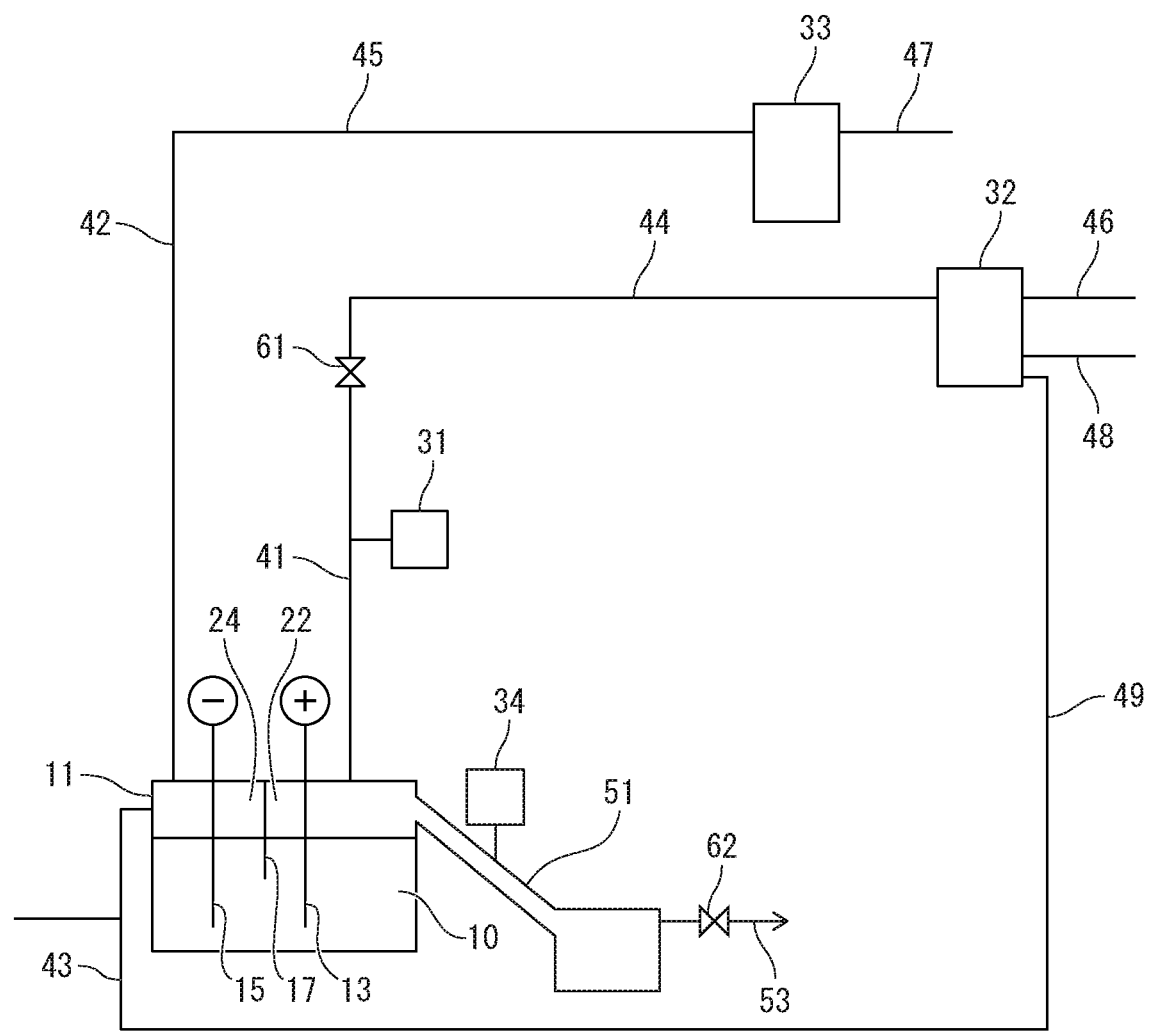
FIG. 7 is a schematic view illustrating a fourth modification example of the device for producing fluorine gas of FIG. 2.

A fourth modification example will be described with reference to FIG. 7. A device for producing fluorine gas of the fourth modification example is an example in which a clogging suppression mechanism is different from that of the second modification example illustrated in FIG. 5. In the device for producing fluorine gas of the second modification example, the first bypass pipe 51 is installed to extend along the horizontal direction; however, in the device for producing fluorine gas of the fourth modification example, the first bypass pipe 51 is inclined with respect to the horizontal direction and extends in a direction in which the first bypass pipe 51 runs downward from the upstream side to the downstream side. This inclination suppresses fine particles from being accumulated inside the first bypass pipe 51. As the inclination increases, the action of suppressing the accumulation of fine particles becomes stronger.

The inclination angle of the first bypass pipe 51 is preferably 30 degrees or more and more preferably 40 degrees or more and 60 degrees or less under a condition where the depression angle from the horizontal plane is smaller than 90 degrees. When the first bypass pipe 51 is about to be clogged, hammering the inclined first bypass pipe 51 makes it easy for an accumulated substance inside the first bypass pipe 51 to move, and thus the clogging can be avoided.

Since the configuration of the device for producing fluorine gas of the fourth modification example is almost the same as the configuration of the device for producing fluorine gas of the second modification example except for the above-described point, the same portions will not be described.

FIFTH MODIFICATION EXAMPLE

Figure 8:
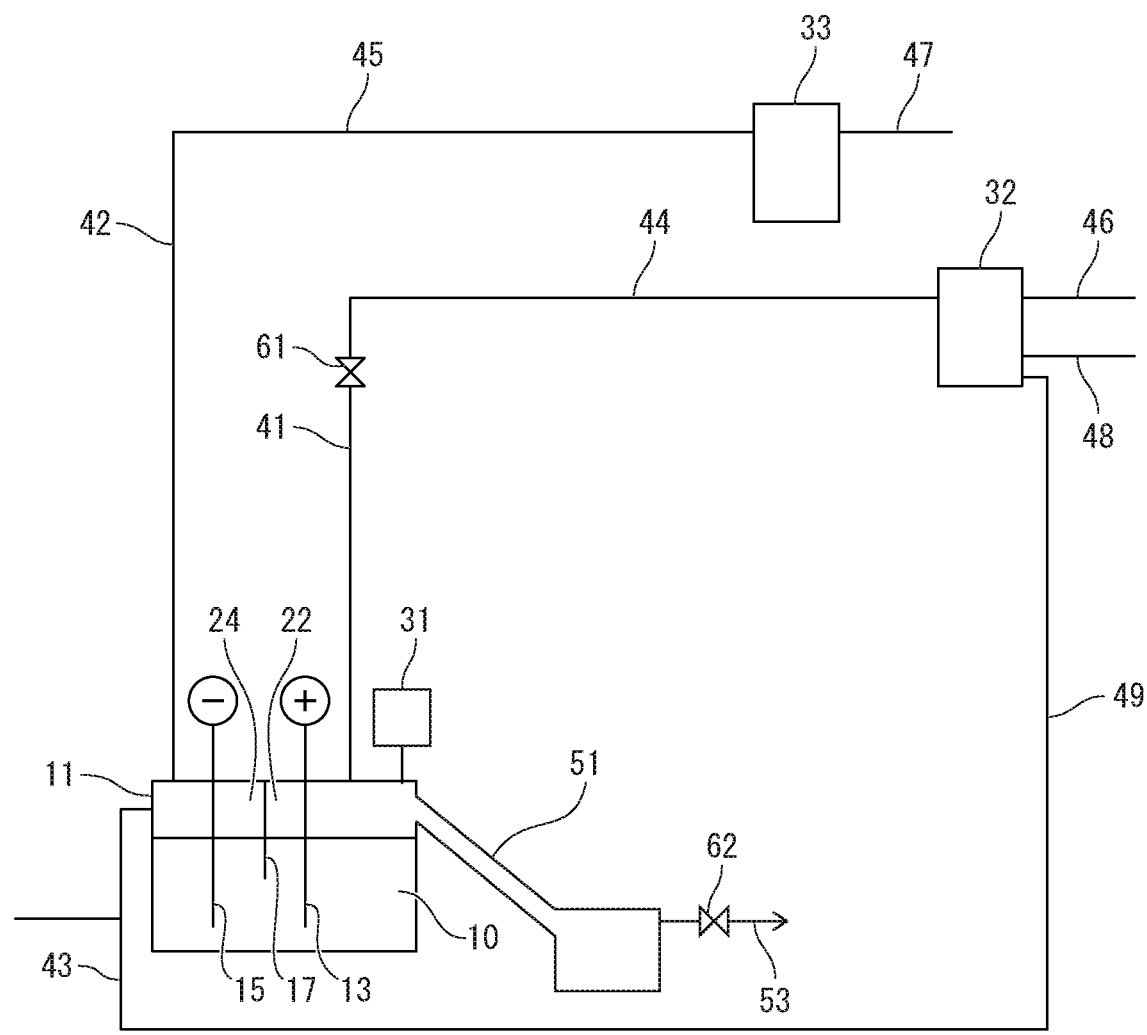
FIG. 8 is a schematic view illustrating a fifth modification example of the device for producing fluorine gas of FIG. 2.

A fifth modification example will be described with reference to FIG. 8. A device for producing fluorine gas of the fifth modification example is an example in which a clogging suppression mechanism is different from that of the third modification example illustrated in FIG. 6. In the device for producing fluorine gas of the third modification example, the first bypass pipe 51 is installed to extend along the horizontal direction; however, in the device for producing fluorine gas of the fifth modification example, the first bypass pipe 51 is inclined with respect to the horizontal direction and extends in a direction in which the first bypass pipe 51 runs downward from the upstream side to the downstream side. This inclination suppresses fine particles from being accumulated inside the first bypass pipe 51. A preferable inclination angle of the first bypass pipe 51 is the same as that in the case of the fourth modification example. Since the configuration of the device for producing fluorine gas of the fifth modification example is almost the same as the configuration of the device for producing fluorine gas of the third modification example except for the above-described point, the same portions will not be described.

SIXTH MODIFICATION EXAMPLE

Figure 9:
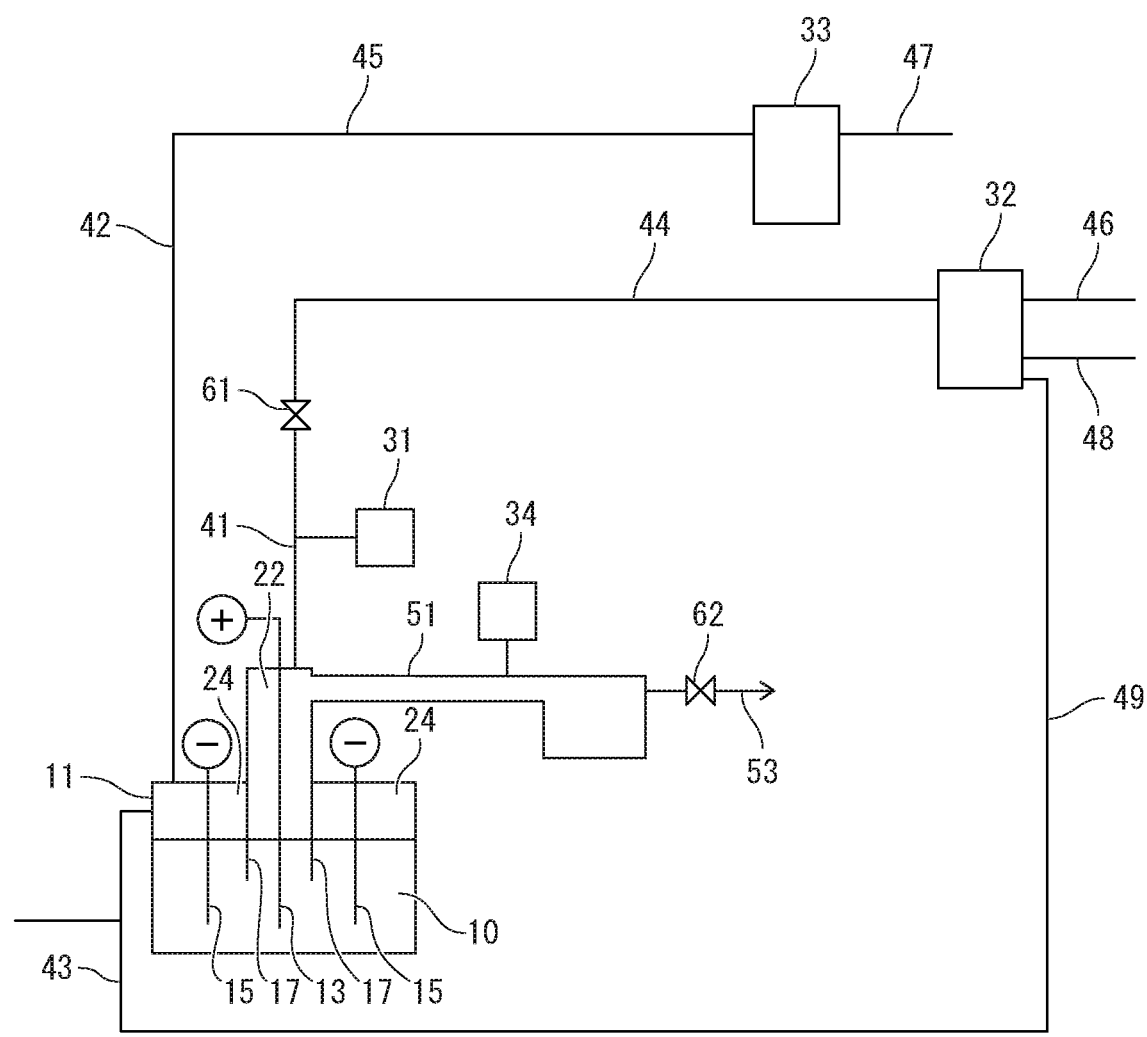
FIG. 9 is a schematic view illustrating a sixth modification example of the device for producing fluorine gas of FIG. 2.

A sixth modification example will be described with reference to FIG. 9. A device for producing fluorine gas of the sixth modification example is an example in which the structure of the electrolytic cell 11 is different from that of the second modification example illustrated in FIG. 5. The electrolytic cell 11 has one anode 13 and two cathodes 15 and 15 and is divided into one anode chamber 22 and one cathode chamber 24 with a tubular partition wall 17 that surrounds one anode 13. The anode chamber 22 is formed to extend upward from the upper surface of the electrolytic cell 11, and the first bypass pipe 51 is connected to the upper end portion of the anode chamber 22 of the electrolytic cell 11. Since the configuration of the device for producing fluorine gas of the sixth modification example is almost the same as the configuration of the device for producing fluorine gas of the second modification example except for the above-described point, the same portions will not be described.

SEVENTH MODIFICATION EXAMPLE

Figure 10:
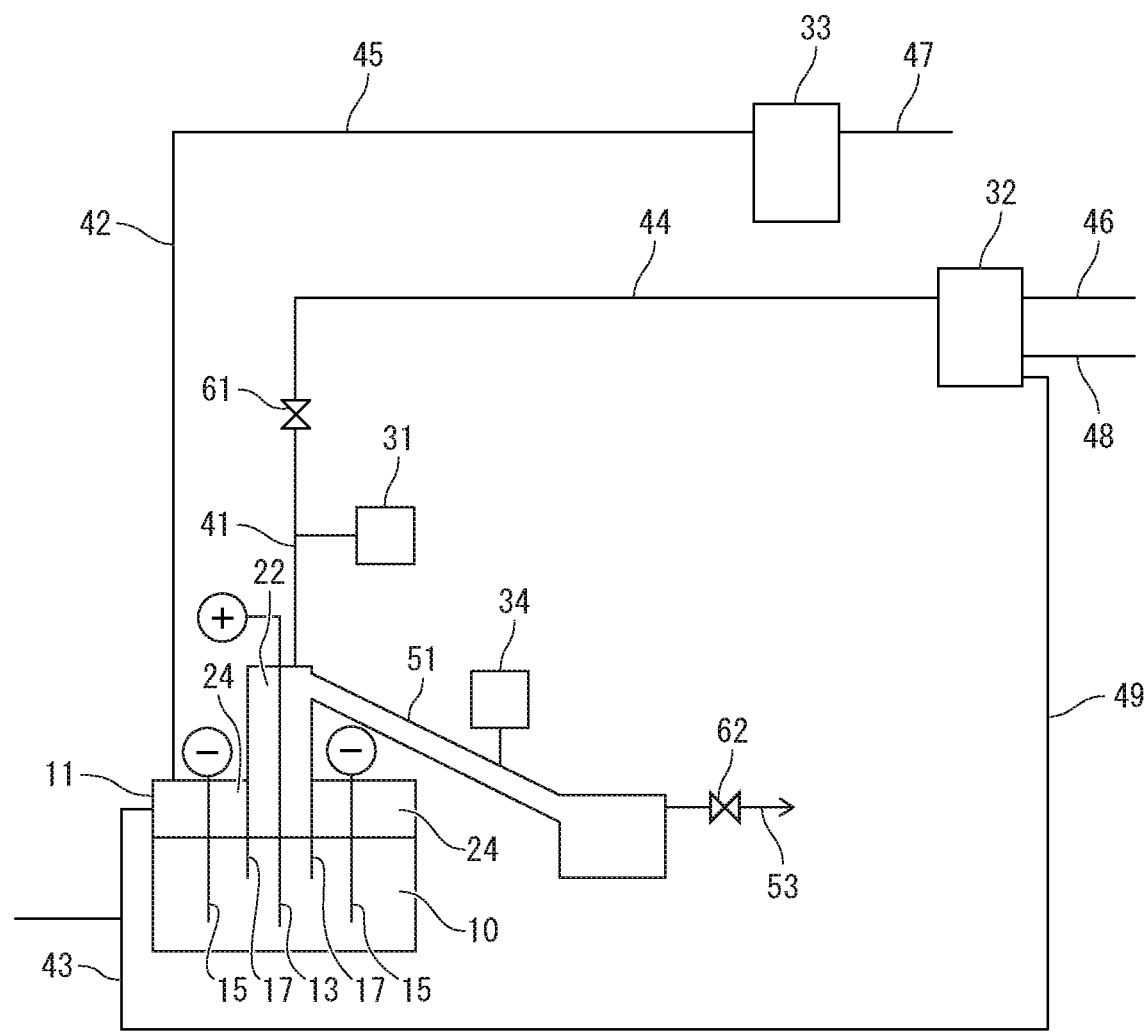
FIG. 10 is a schematic view illustrating a seventh modification example of the device for producing fluorine gas of FIG. 2.

A seventh modification example will be described with reference to FIG. 10. A device for producing fluorine gas of the seventh modification example is an example in which the structure of the first bypass pipe 51 is different from that of the sixth modification example illustrated in FIG. 9. That is, in the device for producing fluorine gas of the seventh modification example, the first bypass pipe 51 is, similar to the fourth modification example and the fifth modification example, inclined with respect to the horizontal direction and extends in a direction in which the first bypass pipe 51 runs downward from the upstream side to the downstream side. A preferable inclination angle of the first bypass pipe 51 is the same as that in the case of the fourth modification example. Since the configuration of the device for producing fluorine gas of the seventh modification example is almost the same as the configuration of the device for producing fluorine gas of the sixth modification example except for the above-described point, the same portions will not be described.

EIGHTH MODIFICATION EXAMPLE

Figure 11:
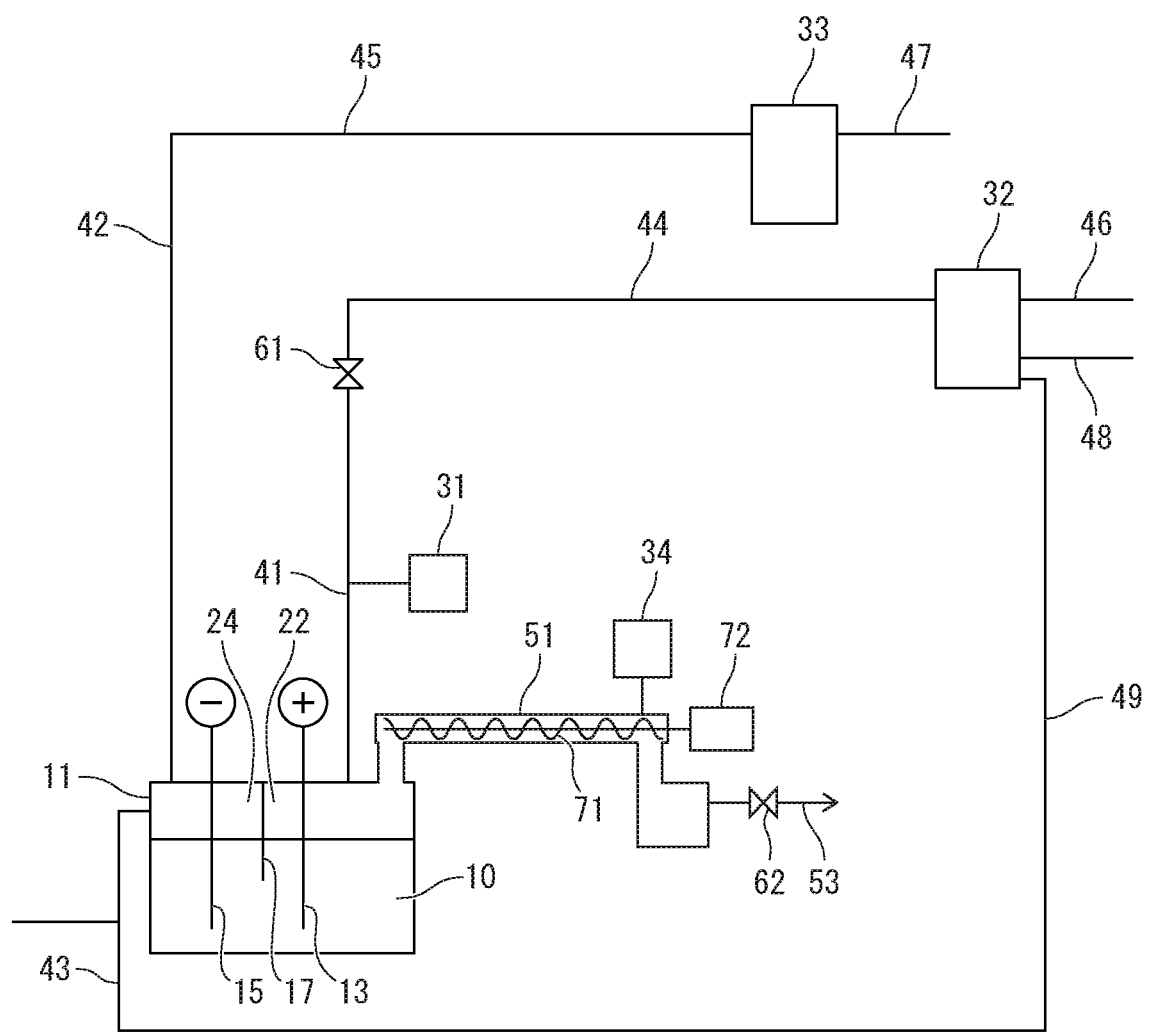
FIG. 11 is a schematic view illustrating an eighth modification example of the device for producing fluorine gas of FIG. 2.

An eighth modification example will be described with reference to FIG. 11. A device for producing fluorine gas of the eighth modification example is an example in which a clogging suppression mechanism is different from that of the second modification example illustrated in FIG. 5. In the device for producing fluorine gas of the eighth modification example, a rotary screw 71 that configures the clogging suppression mechanism is installed inside the first bypass pipe 51. The rotary screw 71 is installed with the rotary shaft parallel to the longitudinal direction of the first bypass pipe 51.

In addition, the mist accumulated inside the first bypass pipe 51 can be sent to the upstream side or the downstream side by rotating the rotary screw 71 with a motor 72. This suppresses fine particles from being accumulated inside the first bypass pipe 51. Since the configuration of the device for producing fluorine gas of the eighth modification example is almost the same as the configuration of the device for producing fluorine gas of the second modification example except for the above-described point, the same portions will not be described.

NINTH MODIFICATION EXAMPLE

Figure 12:
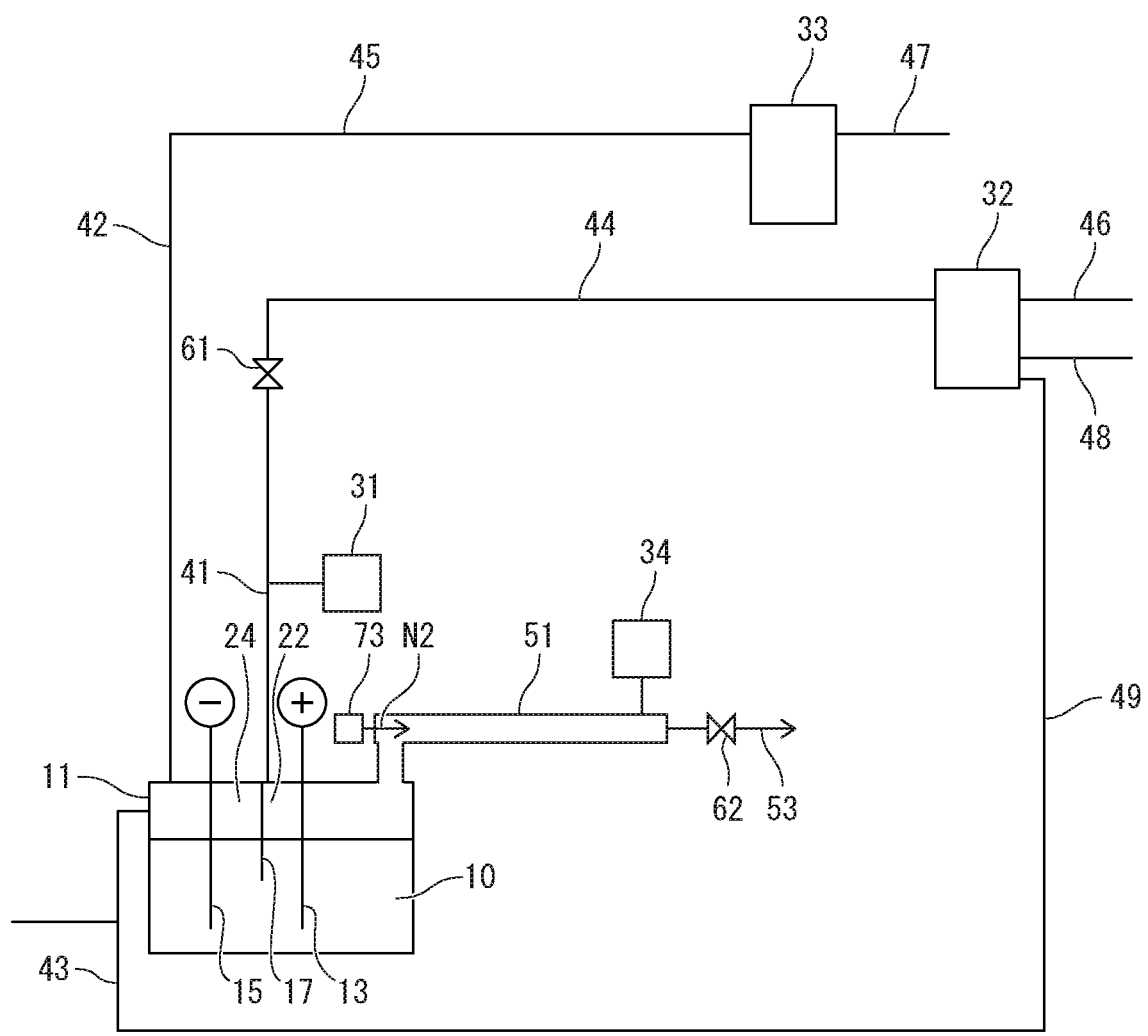
FIG. 12 is a schematic view illustrating a ninth modification example of the device for producing fluorine gas of FIG. 2.

A ninth modification example will be described with reference to FIG. 12. A device for producing fluorine gas of the ninth modification example is an example in which a clogging suppression mechanism is different from that of the second modification example illustrated in FIG. 5. In the device for producing fluorine gas of the ninth modification example, an airflow generator 73 that configures the clogging suppression mechanism is installed on the first bypass pipe 51. The airflow generator 73 sends an airflow (for example, an airflow of nitrogen gas) from the upstream side to the downstream side of the first bypass pipe 51 to increase the flow rate of the anode gas that flows in the first bypass pipe 51. This suppresses fine particles from being accumulated inside the first bypass pipe 51.

A preferable flow rate of the anode gas that flows in the first bypass pipe 51 at this time is 1 m/sec or faster and 10 m/sec or slower. The flow rate can be set to faster than 10 m/sec; however, in that case, a pressure loss caused by a pipe resistance in the first bypass pipe 51 becomes large, and the pressure in the anode chamber 22 of the electrolytic cell 11 becomes high. The pressure in the anode chamber 22 and the pressure in the cathode chamber 24 are preferably about the same; however, when a difference between the pressure in the anode chamber 22 and the pressure in the cathode chamber 24 becomes too large, the anode gas flows over the partition wall 17 into the cathode chamber 24, a reaction between the fluorine gas and the hydrogen gas occurs, and there is a case where the generation of fluorine gas is hindered.

Since the configuration of the device for producing fluorine gas of the ninth modification example is almost the same as the configuration of the device for producing fluorine gas of the second modification example except for the above-described point, the same portions will not be described.

TENTH MODIFICATION EXAMPLE

Figure 13:
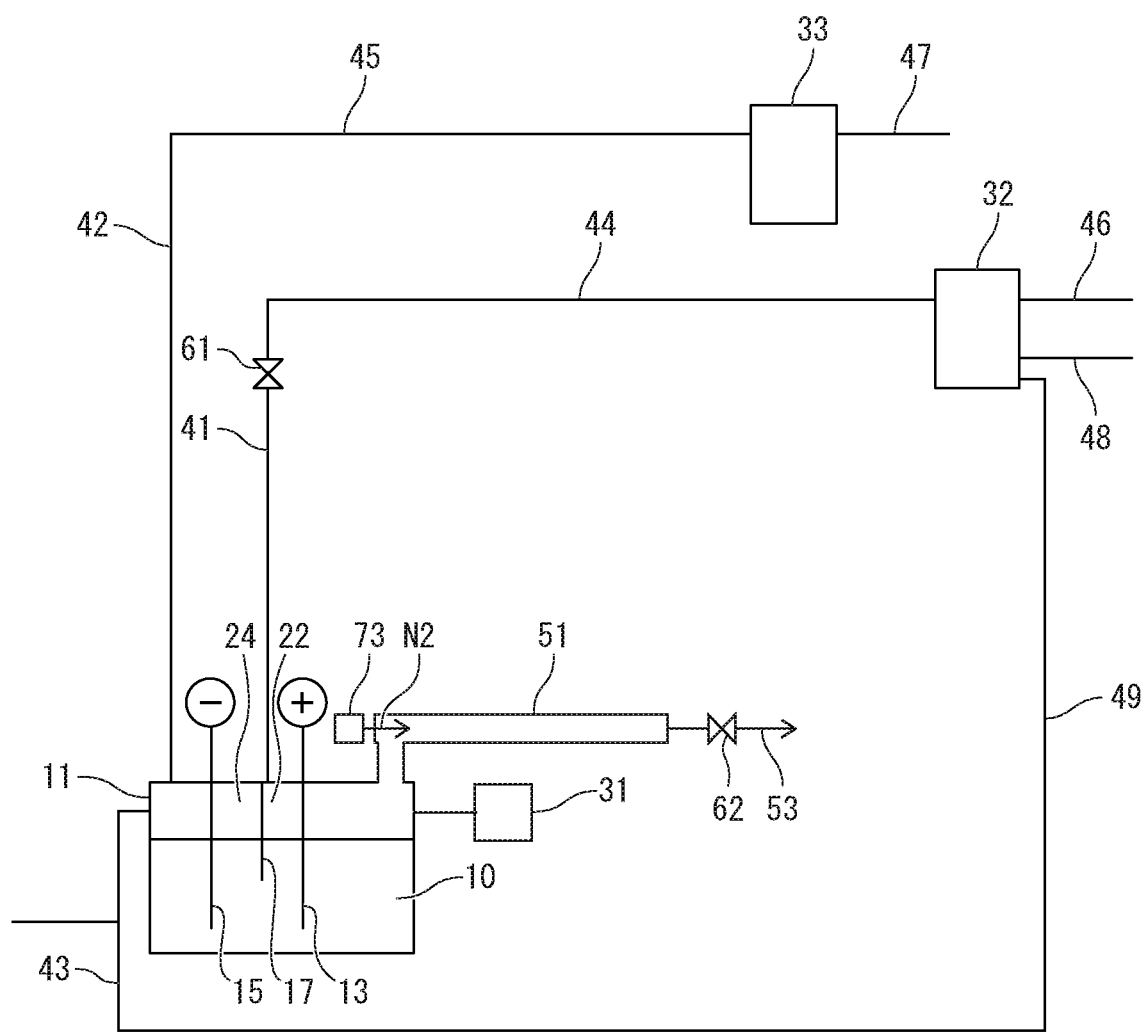
FIG. 13 is a schematic view illustrating a tenth modification example of the device for producing fluorine gas of FIG. 2.

A tenth modification example will be described with reference to FIG. 13. In a device for producing fluorine gas of the tenth modification example, the first average particle size measurement unit 31 is provided in the electrolytic cell 11, the anode gas inside the electrolytic cell 11 is directly introduced into the first average particle size measurement unit 31, and the average particle size of mist is measured. The device for producing fluorine gas of the tenth modification example does not have the second average particle size measurement unit 34. Since the configuration of the device for producing fluorine gas of the tenth modification example is almost the same as the configuration of the device for producing fluorine gas of the ninth modification example illustrated in FIG. 12 except for the above-described point, the same portions will not be described.

EXAMPLES

Hereinafter, the present invention will be described more specifically by describing examples and comparative examples.

Reference Example 1

An electrolyte was electrolyzed, thereby producing fluorine gas. As the electrolyte, a mixed molten salt (560 L) of 434 kg of hydrogen fluoride and 630 kg of potassium fluoride was used. An amorphous carbon electrode (width 30 cm, length 45 cm, thickness 7 cm) manufactured by SGL Carbon was used as an anode, and 16 anodes were installed in an electrolytic cell. In addition, a MONEL (trademark) punching plate was used as a cathode and installed in the electrolytic cell. Two cathodes faced one anode, and the total area of portions of one anode that faced the cathodes was 1736 $cm^2$.

The electrolysis temperature was controlled to be 85° C. to 95° C. First, the temperature of the electrolyte was set to 85° C., a direct current of 1000 A was applied at a current density of 0.036 $A/cm^2$, and electrolysis was begun. The water concentration in the electrolyte at this time was 1.0% by mass. The water concentration was measured by the Karl-Fischer analysis method.

Electrolysis under the above-described condition was begun, and a small explosive sound was observed in the vicinity of the anode in an anode chamber for 10 hours immediately after the beginning of the electrolysis. This explosive sound is considered to be generated due to a reaction between a generated fluorine gas and moisture in the electrolyte.

In this state, a fluid generated at the anode was collected at the time of being sent out from the anode chamber of the electrolytic cell to the outside, and mist that was contained in the fluid was analyzed. As a result, 5.0 to 9.0 mg (calculated with an assumption that the specific gravity of the mist was 1.0 g/mL, which shall also be true below) of fine particles were contained per liter of the fluid generated at the anode, and the average particle size of these fine particles was 1.0 µm to 2.0 µm. When these fine particles were observed with an optical microscope, fine particles having a spherical shape from which the inside was hollowed out were mainly observed. In addition, the current efficiency of the generation of fluorine gas at this time was 0% to 15%.

Furthermore, when the electrolysis was continued until the amount of electricity conducted became 30 kAh, the frequency of generation of the explosive sound inside the anode chamber was reduced. The water concentration in the electrolyte at this time was 0.7% by mass. In addition, in this state, a fluid generated at the anode was collected at the time of being sent out from the anode chamber of the electrolytic cell to the outside, and mist that was contained in the fluid was analyzed. As a result, 0.4 to 1.0 mg of mist was contained per liter of the fluid generated at the anode, and the average particle size of this mist was 0.5 µm to 0.7 µm. Furthermore, the current efficiency of the generation of fluorine gas at this time was 15% to 55%. The step of the electrolysis from the beginning of the electrolysis to this point is defined as "step (1)".

Furthermore, the electrolysis of the electrolyte was continued following the step (1). Then, hydrogen fluoride was consumed, and the level of the electrolyte lowered, and thus hydrogen fluoride was appropriately replenished from a hydrogen fluoride tank to the electrolytic cell. The water concentration in the hydrogen fluoride to be replenished was 500 mass ppm or less.

Furthermore, when the electrolysis was continued and the amount of electricity conducted became 60 kAh, the average particle size of mist that was contained in a fluid generated at the anode became 0.36 µm (that is, 0.4 µm or less). At this point, no explosive sound was generated inside the anode chamber. In addition, the water concentration in the electrolyte at this time was 0.2% by mass (that is, 0.3% by mass or less). Furthermore, the current efficiency of the generation of fluorine gas at this time was 65%. The step of the electrolysis from the end of the step (1) to this point is defined as "step (2)".

Figure 14:
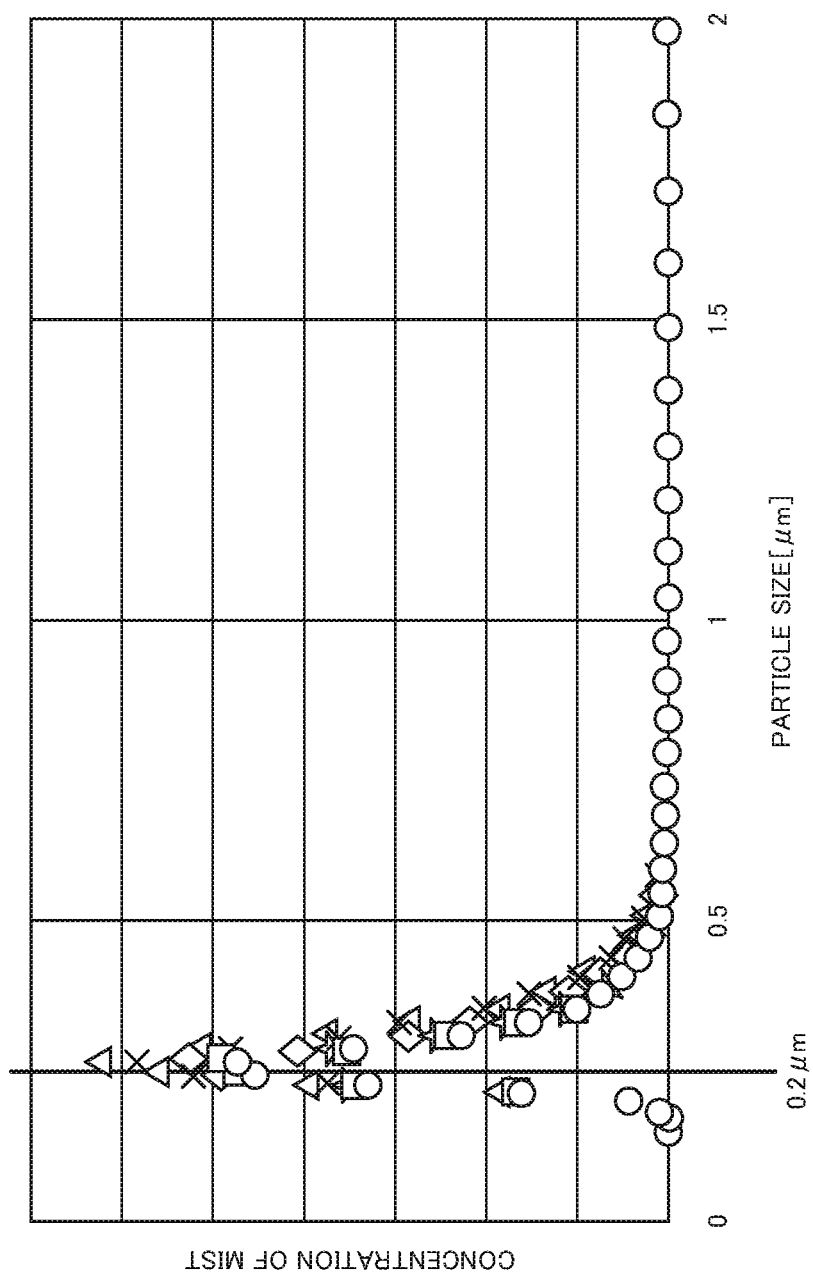
FIG. 14 is a graph illustrating a particle size distribution of mist that is contained in a fluid generated at an anode in Reference Example 1.

Furthermore, the current was increased to 3500 A, the current density was increased to 0.126 $A/cm^2$, and the electrolysis of the electrolyte was continued following the step (2). In this state, a fluid generated at the anode was collected at the time of being sent out from the anode chamber of the electrolytic cell to the outside, and mist that was contained in the fluid was analyzed. As a result, 0.03 mg to 0.06 mg of fine particles were contained per liter of the fluid generated at the anode, the average particle size of these fine particles was about 0.2 µm (0.15 µm to 0.25 µm), and the particle sizes had a distribution of about 0.1 µm to 0.5 µm. FIG. 14 illustrates a measurement result of the particle size distribution of these fine particles. Furthermore, the current efficiency of the generation of fluorine gas at this time was 94%. The step of the electrolysis from the end of the step (2) to this point is defined as "stable step".

The contents of the electrolysis of Reference Example 1 performed as described above are summarized in Table 1. Table 1 also shows currents, electrolysis elapsed times, amounts of electricity conducted, water concentrations in electrolytes, masses of mist contained in 1 L of fluids generated at the anodes (denoted as "anode gas" in Table 1), the average particle sizes of mist, current efficiencies, the amounts of fluids generated at the anodes (containing fluorine gas, oxygen gas, and mist), the amounts of mist generated at the anodes, the intensities of explosive sounds, and the water concentrations in fluids generated at the cathodes (denoted as "water concentration in cathode gas" in Table 1).

Figure 15:
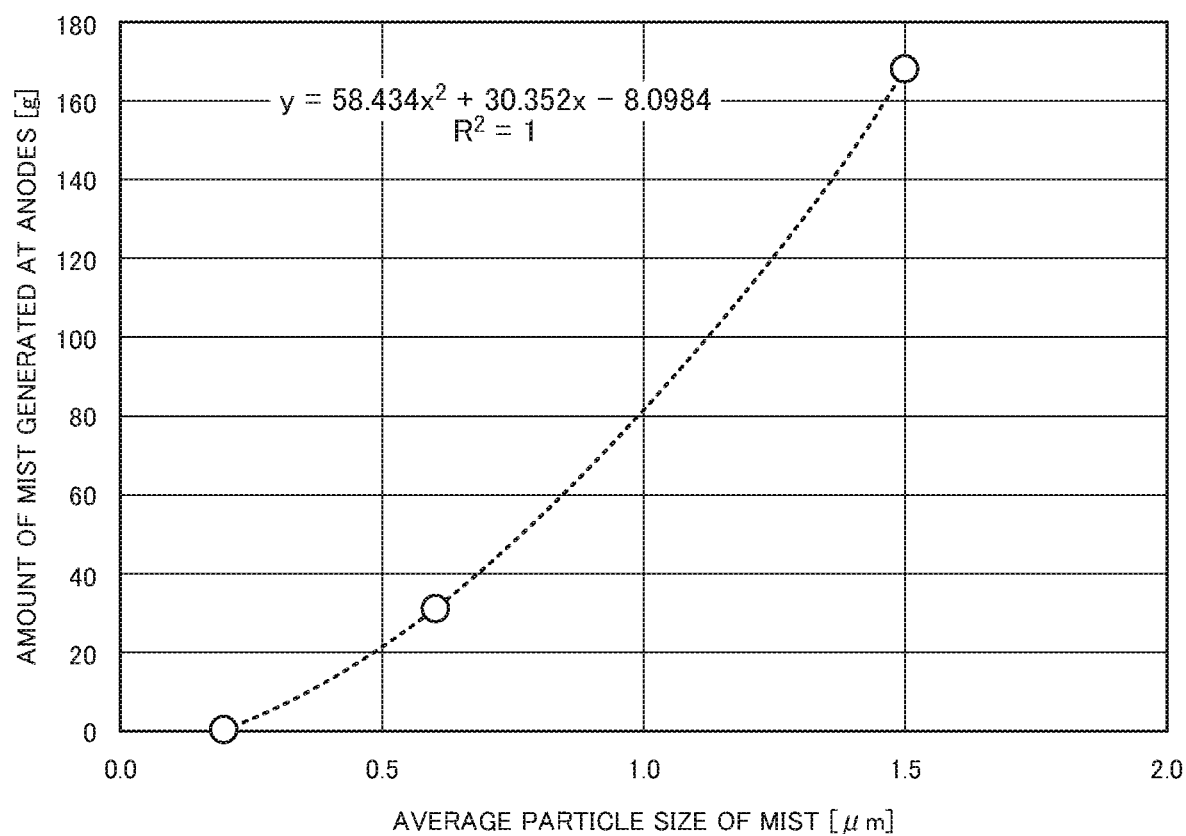
FIG. 15 is a graph illustrating a correlation between the average particle size of the mist and the amount of the mist generated at the anode in Reference Example 1.

In addition, a graph illustrating the relationship between the average particle size of the mist and the amount of the mist generated at the anode is illustrated in FIG. 15. From the graph of FIG. 15, it is found that there is a correlation between the average particle size of the mist and the amount of the mist that is generated at the anode. Since pipes or valves are more likely to be clogged as the amount of the mist generated increases, and in a case where mist having an average particle size of more than 0.4 µm is generated, the amount of the mist generated increases, and furthermore, the mist is deposited due to the action of the force of gravity, it can be said that the relationship illustrated in the graph of FIG. 15 represents the correlation between the average particle size of the mist and the likelihood of clogging of pipes and valves.

TABLE 1

| | Electrolysis | | | | Mist in anode gas | | | | |
| --- | --- | --- | --- | --- | --- | --- | --- | --- | --- |
| Step | Current (A) | Elapsed time (h) | Amount of electricity conducted (kAh) | Water concentration in electrolyte (% by mass) | Amount (mg/L) | Average particle size (µm) | Current efficiency (%) | Intensity of explosive sound (dB) | Water concentration in cathode gas (% by volume) |
| Step (1) | 1000 | 0-30 | 0-30 | 1.0 | 5.0-9.0 | 1.0-2.0 | 0-15 | 50-70 | 0.10 |

TABLE 1-continued

| | Electrolysis | | | | Mist in anode gas | | | | |
|---|---|---|---|---|---|---|---|---|---|
| Step | Current (A) | Elapsed time (h) | Amount of electricity conducted (kAh) | Water concentration in electrolyte (% by mass) | Amount (mg/L) | Average particle size (μm) | Current efficiency (%) | Intensity of explosive sound (dB) | Water concentration in cathode gas (% by volume) |
| Step (2) | 1000 | 30 | 30 | 0.7 | 0.4-1.0 | 0.5-0.7 | 15-55 | 25-35 | 0.07 |
| Step (3) | 1000 | 60 | 60 | 0.2 | No data | 0.36 | 65 | 15-30 | 0.02 |
| Stable step | 3500 | 65 | 77.5 | Less than 0.2 | 0.03-0.06 | 0.15-0.25 | 94 | 2-5 | No data |

Example 1

The same electrolysis as in Reference Example 1 was performed using the device for producing fluorine gas illustrated in FIG. 2. In the electrolysis of the step (1), fluids generated at the anodes were circulated through the second bypass pipes, the bypass valves, and the first bypass pipe. After the electrolysis of the step (1) ended, the electrolysis was temporarily stopped, and the inside of the device for producing fluorine gas was inspected. As a result, although mist was accumulated in the first bypass pipe, the pipe was not clogged since the diameter of the pipe was large.

Since the electrolysis was in the step (2) where the average particle size of the mist was equal to or less than 0.4 μm that was the reference value, fluids generated at the anodes were circulated through the first pipes, the first pipe valves, the fourth pipe, and the first mist removal unit. Accumulation of the mist or clogging did not occur in the first pipes, the first pipe valves, and the fourth pipe, and the fluids generated at the anodes were supplied to the first mist removal unit, and thus the mist was removed in the first mist removal unit. The first mist removal unit was a scrubber-type removal unit configured to remove fine particles such as the mist by spraying liquid hydrogen fluoride, and the mist removing rate was 98% or more.

Comparative Example 1

Electrolysis was performed in the same manner as in Example 1 except that, in the electrolysis of the step (1), the fluids generated at the anodes were circulated through the first pipes, the first pipe valves, the fourth pipe, and the first mist removal unit.

During the electrolysis of the step (1), between pressure gauges attached to the anode side and the cathode side of the electrolytic cell, the measurement value of the pressure gauge on the anode side gradually increased, and the pressure difference from the pressure on the cathode side became 90 mmH$_2$O, and thus the electrolysis was stopped. The reason for stopping the electrolysis is as follows. Since the vertical-direction length (immersion depth) of a part of the partition wall in the electrolytic cell that is immersed in the electrolyte is 5 cm, when the pressure on the anode side is higher than the pressure on the cathode side by about 100 mmH$_2$O, the liquid surface of the electrolyte on the anode side becomes lower than the lower end of the partition wall. As a result, the fluorine gas flows over the partition wall and mixes with the hydrogen gas on the cathode side and causes an abrupt reaction between the fluorine gas and the hydrogen gas, which is extremely dangerous.

After the inside of the system was purged with nitrogen gas or the like, the insides of the first pipes, the first pipe valves, and the fourth pipes were inspected. Since the first pipe was a pipe that extended in the vertical direction, the first pipe was not clogged. A small amount of fine particles adhered to the first pipe valves, and the pipes on the downstream side of the first pipe valves, that is, the inlet portions to the fourth pipe were clogged by the fine particles. The fine particles were also accumulated in the fourth pipe, but the amount was not large enough to clog the pipe.

REFERENCE SIGNS LIST

1 Sample chamber
2 Light source
3 Scattered light detection unit
4A, 4B Transparent window
10 Electrolyte
11 Electrolytic cell
13 Anode
15 Cathode
22 Anode chamber
24 Cathode chamber
31 First average particle size measurement unit
32 First mist removal unit
33 Second mist removal unit
34 Second average particle size measurement unit
41 First pipe
42 Second pipe
43 Third pipe
44 Fourth pipe
45 Fifth pipe
46 Sixth pipe
47 Seventh pipe
48 Eighth pipe
49 Ninth pipe
51 First bypass pipe
52 Second bypass pipe
61 First pipe valve
62 Bypass valve
F Fluid
L Light for light scattering measurement
M Mist
S Scattered light

The invention claimed is:
1. A device for producing fluorine gas in which an electrolyte containing hydrogen fluoride and a metal fluoride is electrolyzed to produce fluorine gas, the device comprising:
    an electrolytic cell storing the electrolyte and configured to perform the electrolysis;
    an average particle size measurement unit configured to measure an average particle size of mist contained in a fluid generated inside the electrolytic cell during the electrolysis of the electrolyte;
    a mist removal unit configured to remove the mist from the fluid;

a fluorine gas selection unit configured to select and extract fluorine gas from the fluid; and a flow path configured to send the fluid from an inside of the electrolytic cell to the fluorine gas selection unit, wherein the flow path has a first flow path configured to send the fluid from the inside of the electrolytic cell through the mist removal unit to the fluorine gas selection unit and a second flow path configured to send the fluid from the inside of the electrolytic cell to the fluorine gas selection unit without passing through the mist removal unit and has a flow path switching unit configured to switch a flow path through which the fluid flows depending on the average particle size of the mist measured by the average particle size measurement unit, the flow path switching unit is configured to send the fluid to the first flow path from the inside of the electrolytic cell in a case where the average particle size of the mist measured by the average particle size measurement unit is equal to or less than a predetermined reference value and to send the fluid to the second flow path from the inside of the electrolytic cell in a case where the average particle size of the mist is more than the predetermined reference value, and the second flow path has a clogging suppression mechanism configured to suppress clogging of the second flow path by the mist.

2. The device for producing fluorine gas according to claim 1, wherein the average particle size measurement unit measures an average particle size of mist contained in a fluid generated at an anode of the electrolytic cell.

3. The device for producing fluorine gas according to claim 2, wherein the clogging suppression mechanism is a pipe having a larger diameter than the first flow path.

4. The device for producing fluorine gas according to claim 2, wherein the clogging suppression mechanism is a pipe inclined with respect to a horizontal direction and extending in a direction in which the pipe runs downward from an upstream side toward a downstream side.

5. The device for producing fluorine gas according to claim 2, wherein the clogging suppression mechanism is a rotary screw installed inside the second flow path and configured to send the mist accumulated inside the second flow path to an upstream side or a downstream side.

6. The device for producing fluorine gas according to claim 2, wherein the clogging suppression mechanism is an airflow generator configured to cause an airflow for increasing a flow rate of the fluid flowing in the second flow path to flow.

7. The device for producing fluorine gas according to claim 2, wherein
the average particle size measurement unit includes a light scattering detector,
the light scattering detector includes
a sample chamber configured to store the fluid,
a light source configured to irradiate the fluid in the sample chamber with light for light scattering measurement,
a scattered light detection unit configured to detect scattered light generated by scattering of the light for light scattering measurement by the mist, and
a transparent window installed in the sample chamber to come into contact with the fluid and configured to transmit the light for light scattering measurement or the scattered light, and
the transparent window is formed of at least one selected from diamond, calcium fluoride, potassium fluoride, silver fluoride, barium fluoride, and potassium bromide.

8. The device for producing fluorine gas according to claim 1, wherein the clogging suppression mechanism is a pipe having a larger diameter than the first flow path.

9. The device for producing fluorine gas according to claim 8, wherein the clogging suppression mechanism is a pipe inclined with respect to a horizontal direction and extending in a direction in which the pipe runs downward from an upstream side toward a downstream side.

10. The device for producing fluorine gas according to claim 8, wherein
the average particle size measurement unit includes a light scattering detector,
the light scattering detector includes
a sample chamber configured to store the fluid,
a light source configured to irradiate the fluid in the sample chamber with light for light scattering measurement,
a scattered light detection unit configured to detect scattered light generated by scattering of the light for light scattering measurement by the mist, and
a transparent window installed in the sample chamber to come into contact with the fluid and configured to transmit the light for light scattering measurement or the scattered light, and
the transparent window is formed of at least one selected from diamond, calcium fluoride, potassium fluoride, silver fluoride, barium fluoride, and potassium bromide.

11. The device for producing fluorine gas according to claim 1, wherein the clogging suppression mechanism is a pipe inclined with respect to a horizontal direction and extending in a direction in which the pipe runs downward from an upstream side toward a downstream side.

12. The device for producing fluorine gas according to claim 11, wherein
the average particle size measurement unit includes a light scattering detector,
the light scattering detector includes
a sample chamber configured to store the fluid,
a light source configured to irradiate the fluid in the sample chamber with light for light scattering measurement,
a scattered light detection unit configured to detect scattered light generated by scattering of the light for light scattering measurement by the mist, and
a transparent window installed in the sample chamber to come into contact with the fluid and configured to transmit the light for light scattering measurement or the scattered light, and
the transparent window is formed of at least one selected from diamond, calcium fluoride, potassium fluoride, silver fluoride, barium fluoride, and potassium bromide.

13. The device for producing fluorine gas according to claim 1, wherein the clogging suppression mechanism is a rotary screw installed inside the second flow path and configured to send the mist accumulated inside the second flow path to an upstream side or a downstream side.

14. The device for producing fluorine gas according to claim 13, wherein
the average particle size measurement unit includes a light scattering detector,
the light scattering detector includes a sample chamber configured to store the fluid, a light source configured to irradiate the fluid in the sample chamber with light for light scattering measurement, a scattered light detection unit configured to detect scattered light generated by scattering of the light for light scattering measurement by the mist, and a transparent window installed in the sample chamber to come into contact with the fluid and configured to transmit the light for light scattering measurement or the scattered light, and the transparent window is formed of at least one selected from diamond, calcium fluoride, potassium fluoride, silver fluoride, barium fluoride, and potassium bromide.

15. The device for producing fluorine gas according to claim 1, wherein the clogging suppression mechanism is an airflow generator configured to cause an airflow for increasing a flow rate of the fluid flowing in the second flow path to flow.

16. The device for producing fluorine gas according to claim 15, wherein the average particle size measurement unit includes a light scattering detector, the light scattering detector includes a sample chamber configured to store the fluid, a light source configured to irradiate the fluid in the sample chamber with light for light scattering measurement, a scattered light detection unit configured to detect scattered light generated by scattering of the light for light scattering measurement by the mist, and a transparent window installed in the sample chamber to come into contact with the fluid and configured to transmit the light for light scattering measurement or the scattered light, and the transparent window is formed of at least one selected from diamond, calcium fluoride, potassium fluoride, silver fluoride, barium fluoride, and potassium bromide.

17. The device for producing fluorine gas according to claim 1, wherein the average particle size measurement unit includes a light scattering detector, the light scattering detector includes a sample chamber configured to store the fluid, a light source configured to irradiate the fluid in the sample chamber with light for light scattering measurement, a scattered light detection unit configured to detect scattered light generated by scattering of the light for light scattering measurement by the mist, and a transparent window installed in the sample chamber to come into contact with the fluid and configured to transmit the light for light scattering measurement or the scattered light, and the transparent window is formed of at least one selected from diamond, calcium fluoride, potassium fluoride, silver fluoride, barium fluoride, and potassium bromide.

* * * * *